US012656300B2

(12) United States Patent
Ichikawa et al.

(10) Patent No.: US 12,656,300 B2
(45) Date of Patent: Jun. 16, 2026

(54) GAS SENSOR

(71) Applicant: NGK INSULATORS, LTD., Nagoya (JP)

(72) Inventors: Daichi Ichikawa, Nagoya (JP); Taku Okamoto, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 261 days.

(21) Appl. No.: 18/414,696

(22) Filed: Jan. 17, 2024

(65) Prior Publication Data

US 2024/0192160 A1     Jun. 13, 2024

Related U.S. Application Data

(63) Continuation of application No. PCT/JP2022/030972, filed on Aug. 16, 2022.

(30) Foreign Application Priority Data

Aug. 25, 2021     (JP) ................................. 2021-137094

(51) Int. Cl.
G01N 27/409     (2006.01)
G01N 27/41     (2006.01)
G01N 27/419     (2006.01)
(52) U.S. Cl.
CPC ........... G01N 27/409 (2013.01); G01N 27/41 (2013.01); G01N 27/419 (2013.01)
(58) Field of Classification Search
CPC .... G01N 27/409; G01N 27/41; G01N 27/419; G01N 27/4175
See application file for complete search history.

(56) References Cited

U.S. PATENT DOCUMENTS

2004/0221641 A1* 11/2004 Moritsugu ........... G01N 33/007
                                                                73/23.31
2009/0205193 A1     8/2009 Nakagaki et al.
(Continued)

FOREIGN PATENT DOCUMENTS

JP          61-212753 A      9/1986
JP      2003-329640 A     11/2003
(Continued)

OTHER PUBLICATIONS

International Preliminary Report on Patentability received in corresponding International Application No. PCT/JP2022/030972 dated Feb. 27, 2024.

(Continued)

*Primary Examiner* — Shizhi Qian
(74) *Attorney, Agent, or Firm* — MATTINGLY & MALUR, PC

(57)          ABSTRACT

A gas sensor includes: a sensor element including an element body which is internally provided with a measurement-object gas flow portion that introduces a measurement-object gas and causes the measurement-object gas to flow, a measurement pump cell having an inner measurement electrode disposed in a measurement chamber and an adjustment pump cell that adjusts an oxygen concentration in an oxygen concentration adjustment chamber, a necessity determiner that performs a refresh necessity determination process of determining necessity of a refresh of the sensor element based on at least one of undershoot or overshoot at a time of rapid change in a measurement pump current; and a refresh controller that, upon a determination that the refresh is necessary in the refresh necessity determination process, performs a refresh process including at least one of an adjustment pump control process during refresh or a measurement pump control process during refresh.

7 Claims, 8 Drawing Sheets

(56)    References Cited

U.S. PATENT DOCUMENTS

| | | | | |
|---|---|---|---|---|
| 2011/0016949 A1* | 1/2011 | Sasaki | ............... | G01N 27/4175 |
| | | | | 73/23.31 |
| 2013/0122441 A1* | 5/2013 | Nakagaki | .................. | F27D 7/00 |
| | | | | 432/9 |
| 2015/0293052 A1* | 10/2015 | Reinhardt | ............. | F02D 41/146 |
| | | | | 205/781 |
| 2018/0340909 A1* | 11/2018 | Koyabu | ............. | G01N 27/4163 |
| 2020/0003725 A1* | 1/2020 | Nakagaki | ............. | G01N 27/417 |
| 2020/0003726 A1* | 1/2020 | Nakagaki | ........... | G01N 27/4071 |
| 2021/0063369 A1 | 3/2021 | Watanabe et al. | | |

FOREIGN PATENT DOCUMENTS

| | | | |
|---|---|---|---|
| JP | 2009-229225 A | 10/2009 |
| JP | 2014-190939 A | 10/2014 |
| JP | 2020-165815 A | 10/2020 |
| JP | 2021-39088 A | 3/2021 |
| JP | 2021-85664 A | 6/2021 |
| WO | 2008/038773 A1 | 4/2008 |

OTHER PUBLICATIONS

International Search Report of PCT/JP2022/030972 dated Oct. 4, 2022.

\* cited by examiner

GAS SENSOR

CROSS-REFERENCE TO RELATED APPLICATION

This application is a continuation application of PCT/JP2022/030972, filed on Aug. 16, 2022, which claims the benefit of priority of Japanese Patent Application No. 2021-137094 filed on Aug. 25, 2021, the entire contents of which are incorporated herein by reference.

BACKGROUND OF THE INVENTION

1. Field of the Invention

The present invention relates to a gas sensor.

2. Description of the Related Art

Hitherto, a gas sensor that detects the concentration of a specific gas, such as NOx, in a measurement-object gas, such as the exhaust gas of an automobile, is known. For example, the NOx sensor described in PTL 1 includes an electrochemical pump cell constituted by including an oxygen-ion-conductive solid electrolyte, and a measurement electrode having NOx reducing ability. The NOx sensor converts the NOx gas in a measurement-object gas to $O_2$ gas at the measurement electrode, and outputs the NOx concentration in the measurement-object gas based on the pump current which flows through the electrochemical pump cell and varies according to the concentration of the converted $O_2$ gas.

PTL 1 also describes the undershoot which occurs in the NOx sensor, for example when fuel cut to stop supply of fuel to an engine is performed and the NOx concentration changes to zero, the output signal for the NOx concentration temporarily decreases significantly further than the ideal signal. When such undershoot occurs, the accuracy of measurement of the NOx concentration is likely to degrade which is unfavorable. PTL 2 states that such a phenomenon occurs due to a change in the moisture in the measurement-object gas. In addition, PTL 1 states that the undershoot can be suppressed by performing a rich process of treating the sensor element of the NOx sensor in a rich atmosphere at a temperature of 500° C. or higher for 15 minutes or more. The rich atmosphere then is a gas atmosphere that contains hydrocarbon, and the concentration of NO is 0.05% or more and 1.0% or less by volume ratio, and the air excess coefficient (A) is 0.80 to 0.9999.

CITATION LIST

Patent Literature

PTL 1: Japanese Unexamined Patent Application Publication No. 2014-190939
PTL 2: International Publication No. 2008/038773 pamphlet

SUMMARY OF THE INVENTION

Meanwhile, even in the gas sensor in which the above-described undershoot of the pump current does not occur when the gas sensor is manufactured, the undershoot may increase with use of the gas sensor. As in the case of undershoot, the overshoot may also increase with use of the gas sensor.

The present invention has been devised to solve such a problem, and it is a main object to suppress the increase in the undershoot and overshoot of the measurement pump current with use of the gas sensor.

The present invention employs the following device to achieve the above-described object.

[1] The gas sensor of the present invention is a gas sensor including: a sensor element including an element body which includes an oxygen-ion-conductive solid electrolyte layer, and is internally provided with a measurement-object gas flow portion that introduces a measurement-object gas and causes the measurement-object gas to flow, a measurement pump cell having an outer measurement electrode provided outside the element body to come into contact with the measurement-object gas, and an inner measurement electrode disposed in a measurement chamber of the measurement-object gas flow portion, the measurement pump cell being configured to pump out oxygen from a periphery of the inner measurement electrode to a periphery of the outer measurement electrode, an adjustment pump cell that adjusts an oxygen concentration in an oxygen concentration adjustment chamber provided upstream of the measurement chamber of the measurement-object gas flow portion, a reference electrode disposed inside the element body to come into contact with a reference gas which serves as a reference for detection of a specific gas concentration in the measurement-object gas, and a measurement voltage detection sensor cell that detects a voltage for measurement across the reference electrode and the inner measurement electrode; a specific gas concentration detection section that performs a normal time adjustment pump control process of operating the adjustment pump cell, and a normal time measurement pump control process of pumping out oxygen in the measurement chamber by controlling the measurement pump cell so that the measurement voltage of the sensor element reaches a target value, then detects the specific gas concentration in the measurement-object gas based on a measurement pump current which flows through the measurement pump cell by the normal time measurement pump control process; a necessity determiner that performs a refresh necessity determination process of determining necessity of a refresh of the sensor element based on at least one of undershoot or overshoot at a time of rapid change in the measurement pump current; and a refresh controller that, upon a determination that the refresh is necessary in the refresh necessity determination process, performs a refresh process including at least one of an adjustment pump control process during refresh or a measurement pump control process during refresh, the adjustment pump control process during refresh for controlling the adjustment pump cell so that oxygen in the oxygen concentration adjustment chamber is pumped out in greater volume than in the normal time adjustment pump control process, the measurement pump control process during refresh for controlling the measurement pump cell so that oxygen in the measurement chamber is pumped out in greater volume than in the normal time measurement pump control process.

In this gas sensor, the normal time adjustment pump control process of operating the adjustment pump cell, and the normal time measurement pump control process of pumping out the oxygen in the measurement chamber by controlling the measurement pump cell so that the measurement voltage of the sensor element reaches a target value are performed. The specific gas concentration in the measurement-object gas is detected based on the measurement pump current which flows through the measurement pump cell by the normal time measurement pump control process. When the gas sensor is used for detection of the specific gas concentration in this manner, the undershoot and overshoot of the measurement pump current at a time of rapid change may increase with use of the gas sensor. In this gas sensor, a refresh necessity determination process of determining necessity of a refresh of the sensor element is performed based on at least one of the undershoot or the overshoot of the measurement pump current at a time of rapid change, and when a refresh is determined to be necessary, a refresh process is performed. The refresh process includes at least one of the adjustment pump control process during refresh or the measurement pump control process during refresh, the adjustment pump control process during refresh for controlling the adjustment pump cell so that oxygen in the oxygen concentration adjustment chamber is pumped out in greater volume than in the normal time adjustment pump control process, the measurement pump control process during refresh for controlling the measurement pump cell so that oxygen in the measurement chamber is pumped out in greater volume than in the normal time adjustment pump control process. The inventors have found out that the undershoot and overshoot which have increased with use of the gas sensor can be reduced by performing such a refresh process. In this gas sensor, when necessity determination of a refresh is made, and a refresh is determined to be necessary, performing the refresh process can suppress an increase in the undershoot and overshoot of the measurement pump current with use of the gas sensor.

Here, the refresh necessity determination process is not limited to a process of determining necessity based on the measurement pump current itself, and also includes a process of determining necessity based on a value convertible to the measurement pump current or a value considered to be equivalent to the measurement pump current. For example, the refresh necessity determination process may be performed based on at least one of the undershoot or overshoot at a time of rapid change in the value of a specific gas concentration detected based on the measurement pump current. During the refresh process, preferably, the specific gas concentration detection section does not perform the normal time measurement pump control process, furthermore, more preferably, does not perform the normal time adjustment pump control process either. During the refresh process, preferably, the measurement pump cell does not perform control such as pumping oxygen into the measurement chamber, and furthermore, more preferably, the adjustment pump cell does not perform control such as pumping oxygen into the oxygen concentration adjustment chamber.

[2] In the above-described gas sensor (the gas sensor according to [1]), the refresh process may include the adjustment pump control process during refresh. The adjustment pump control process during refresh has a higher effect of refreshing the sensor element than the measurement pump control process during refresh. Therefore, the effect of suppressing the undershoot and overshoot of the measurement pump current can be increased, and the refresh process can be performed in a shorter time by performing at least the adjustment pump control process during refresh in the refresh process. In this case, the refresh process may not include the measurement pump control process during refresh.

[3] In the above-described gas sensor (the gas sensor according to [2]), the oxygen concentration adjustment chamber may have a first internal cavity, and a second internal cavity provided downstream of the first internal cavity and upstream of the measurement chamber, the adjustment pump cell may have a main pump cell that adjusts an oxygen concentration in the first internal cavity, and an auxiliary pump cell that adjusts an oxygen concentration in the second internal cavity, and the adjustment pump control process during refresh may include at least one of a process of controlling the main pump cell or a process of controlling the auxiliary pump cell, the process of controlling the main pump cell being performed so that oxygen in the first internal cavity is pumped out in greater volume than in the normal time adjustment pump control process, the process of controlling the auxiliary pump cell being performed so that oxygen in the second internal cavity is pumped out in greater volume than in the normal time adjustment pump control process.

[4] In the above-described gas sensor (the gas sensor according to any one of [1] to [3]), the measurement-object gas may be exhaust gas of an internal combustion engine, and the necessity determiner may perform the refresh necessity determination process based on a behavior of the measurement pump current at a time of rapid change caused by fuel cut of the internal combustion engine. The undershoot and overshoot of the measurement pump current are likely to occur at a time of rapid change in the $H_2O$ concentration (moisture) in the measurement-object gas. At the time of fuel cut of the internal combustion engine, it is highly probable that the $H_2O$ concentration rapidly changes. Therefore, necessity of a refresh can be determined more appropriately by determining the necessity based on the behavior (at least one of the undershoot or the overshoot) of the measurement pump current at a time of rapid change caused by fuel cut of the internal combustion engine.

[5] In the above-described gas sensor (the gas sensor according to any one of [1] to [4]), the necessity determiner may determine that the refresh is necessary when at least one of an amount of undershoot or an amount of overshoot at a time of rapid change in the measurement pump current is out of an acceptable range. In this manner, necessity of a refresh can be determined more appropriately based on at least one of the amount of undershoot or the amount of overshoot.

[6] In the above-described gas sensor (the gas sensor according to any one of [1] to [5]), when the measurement-object gas in the measurement-object gas flow portion is considered to contain carbon, the refresh controller may perform the refresh process. Here, the refresh process needs to be performed in a state where the measurement-object gas contains carbon. Therefore, effective refresh is made possible by performing the refresh process when the measurement-object gas in the measurement-object gas flow portion is considered to contain carbon. Thus, for example, the following situation is unlikely occur: even if the refresh process is performed, undershoot and overshoot are not reduced and the refresh process is necessary again. Here, "the measurement-object contains carbon" includes a case where the measurement-object contains molecules having carbon. For example, when the measurement-object gas contains one or more of carbon (C), carbon monoxide (CO), carbon dioxide ($CO_2$), hydrocarbon (HC), it may be said that the measurement-object gas contains carbon.

[7] In the above-described gas sensor (the gas sensor according to any one of [1] to [6]), the processing time of the refresh process may be 1 second or more and 10 seconds or less. With the processing time of 1 second or more, the sensor element can be refreshed more reliably. Even if the refresh process is performed for a long time, the refreshing effect is not increased so much, and the refreshing effect is relatively high during the first 10 seconds from the start. Because the specific gas concentration cannot be detected correctly during the refresh process, it is preferable that the processing time of the refresh process be short. With the processing time of 10 seconds or less, the time during which the specific gas concentration cannot be detected correctly is reduced, and the sensor element can be efficiently refreshed.

DETAILED DESCRIPTION OF THE INVENTION

Figure 1:
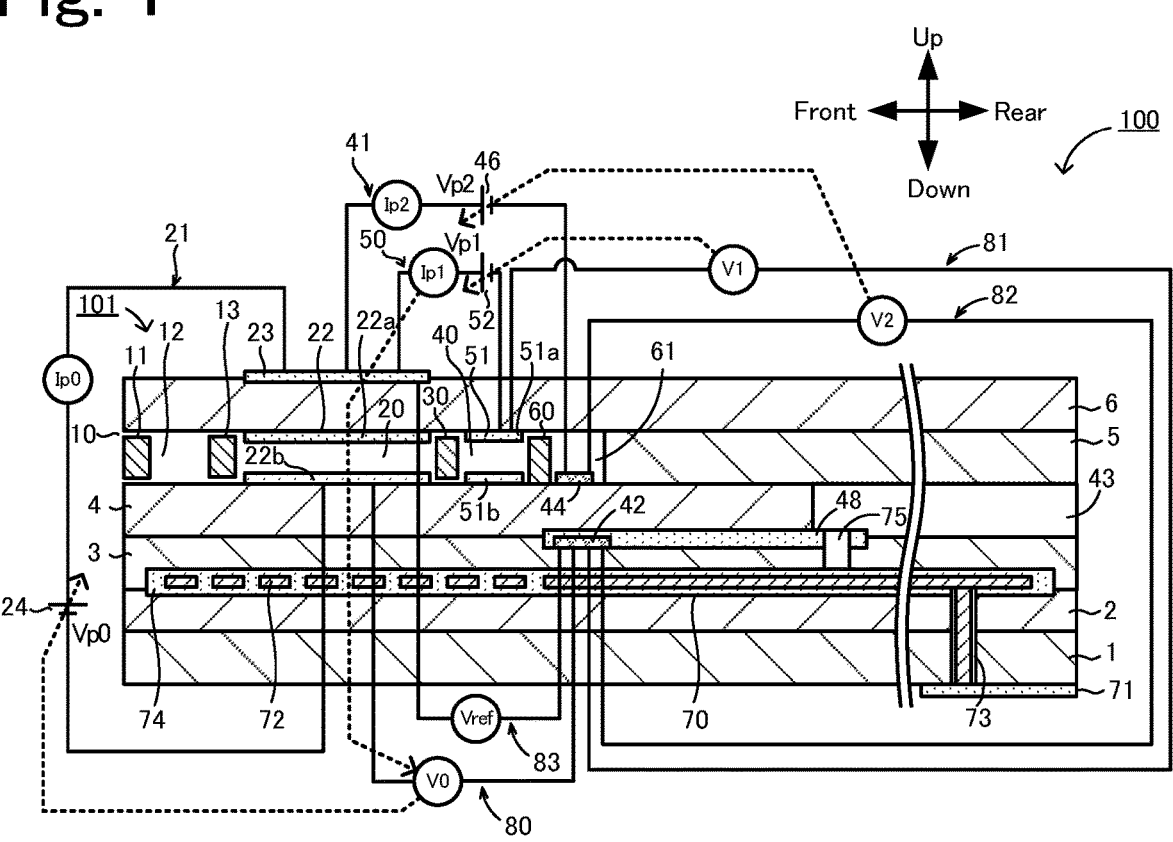
FIG. 1 is a schematic cross-sectional view of a gas sensor 100.
Figure 2:
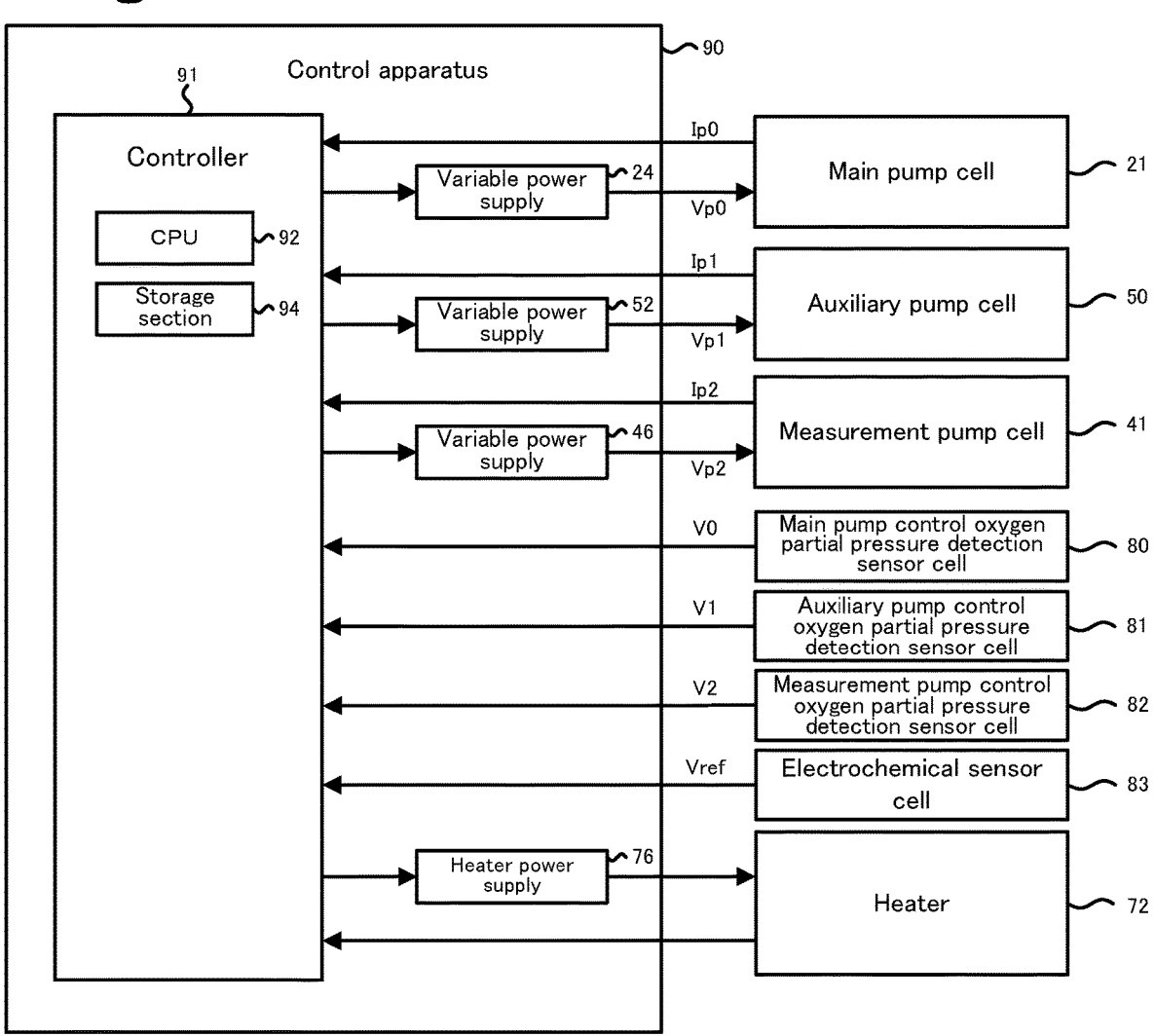
FIG. 2 is a block diagram showing an electrical connection relationship between a control apparatus 90, and cells as well as a heater 72.

Next, an embodiment of the present invention will be described using the drawings. FIG. 1 is a schematic cross-sectional view schematically showing an example of a configuration of a gas sensor 100 which is an embodiment of the present invention. FIG. 2 is a block diagram showing electrical connection relationship between a control apparatus 90, and cells as well as a heater 72. The gas sensor 100 is, for example, installed in a pipe, such as an exhaust gas pipe of an internal combustion engine, such as a gasoline engine and a diesel engine. The gas sensor 100 uses the exhaust gas from the internal combustion engine as a measurement-object gas, and detects the specific gas concentration, such as NOx in the measurement-object gas. The gas sensor 100 includes a long rectangular parallelepiped sensor element 101, cells 15, 21, 41, 50, 80 to 83 each including a part of the sensor element 101, a heater portion 70 provided inside the sensor element 101, and the control apparatus 90 that controls the overall gas sensor 100.

The sensor element 101 is an element having a layered body in which six layers, that is, a first substrate layer 1, a second substrate layer 2, a third substrate layer 3, a first solid electrolyte layer 4, a spacer layer 5, and a second solid electrolyte layer 6, each made up of an oxygen-ion-conductive solid electrolyte layer made of zirconia ($ZrO_2$) or the like, are laminated in this order from a lower side in the drawing. The solid electrolyte forming these six layers is a dense, airtight one. The sensor element 101 is manufactured by, for example, applying predetermined processing, printing of a circuit pattern, and the like on a ceramic green sheet corresponding to each layer, then laminating those sheets, and further firing the sheets to be integrated.

At a tip end portion side of the sensor element 101 (left end portion side in FIG. 1), a gas inlet port 10, a first diffusion controlled portion 11, a buffer space 12, a second diffusion controlled portion 13, a first internal cavity 20, a third diffusion controlled portion 30, a second internal cavity 40, a fourth diffusion controlled portion 60, and a third internal cavity 61 are formed adjacent to each other so as to communicate with each other in this order between the under surface of the second solid electrolyte layer 6 and the top surface of the first solid electrolyte layer 4.

The gas inlet port 10, the buffer space 12, the first internal cavity 20, the second internal cavity 40, and the third internal cavity 61 are spaces of which top parts, bottom parts, and side parts, provided by hollowing the spacer layer 5, are respectively defined by the under surface of the second solid electrolyte layer 6, the top surface of the first solid electrolyte layer 4, and the side surface of the spacer layer 5 inside the sensor element 101.

Each of the first diffusion controlled portion 11, the second diffusion controlled portion 13, and the third diffusion controlled portion 30 is provided as two laterally long slits (openings of which the longitudinal direction is a direction perpendicular to the drawing). The fourth diffusion controlled portion 60 is provided as a single laterally long slit (an opening of which the longitudinal direction is a direction perpendicular to the drawing) formed as a clearance from the under surface of the second solid electrolyte layer 6. A part from the gas inlet port 10 to the third internal cavity 61 is also referred to as measurement-object gas flow portion.

At a location farther from the tip end side than the measurement-object gas flow portion, a reference gas inlet space 43 is provided between the top surface of the third substrate layer 3 and the under surface of the spacer layer 5 at a location at which the side part is defined by the side surface of the first solid electrolyte layer 4. For example, the atmosphere is introduced into the reference gas inlet space 43 as a reference gas at the time of measuring a NOx concentration.

An atmosphere inlet layer 48 is a layer made of porous ceramics. The reference gas is introduced into the atmosphere inlet layer 48 through the reference gas inlet space 43. The atmosphere inlet layer 48 is formed so as to coat the reference electrode 42.

The reference electrode 42 is an electrode formed in such a manner in which the reference electrode 42 is sandwiched by the top surface of the third substrate layer 3 and the first solid electrolyte layer 4. As described above, the atmosphere inlet layer 48 that communicates with the reference gas inlet space 43 is provided around the reference electrode 42. As will be described later, it is possible to measure an oxygen concentration (oxygen partial pressure) in the first internal cavity 20, an oxygen concentration (oxygen partial pressure) in the second internal cavity 40, and an oxygen concentration (oxygen partial pressure) in the third internal cavity 61 by using the reference electrode 42. The reference electrode 42 is formed as a porous cermet electrode (for example, a cermet electrode of Pt and $ZrO_2$).

In the measurement-object gas flow portion, the gas inlet port 10 is a portion that is open to an external space, and a measurement-object gas is taken into the sensor element 101 from the external space through the gas inlet port 10. The first diffusion controlled portion 11 is a portion that applies predetermined diffusion resistance to a measurement-object gas taken in through the gas inlet port 10. The buffer space 12 is a space provided to guide the measurement-object gas introduced from the first diffusion controlled portion 11 to the second diffusion controlled portion 13. The second diffusion controlled portion 13 is a portion that applies predetermined diffusion resistance to the measurement-object gas introduced from the buffer space 12 into the first internal cavity 20. When the measurement-object gas is introduced from the outside of the sensor element 101 into the first internal cavity 20, the measurement-object gas rapidly taken into the sensor element 101 through the gas inlet port 10 due to pressure fluctuations of the measurement-object gas in the external space (due to pulsation of exhaust pressure when the measurement-object gas is the exhaust gas of an automobile) is not directly introduced into the first internal cavity 20 but, after pressure fluctuations of the measurement-object gas are cancelled out through the first diffusion controlled portion 11, the buffer space 12, and the second diffusion controlled portion 13, the measurement-object gas is introduced into the first internal cavity 20. With this configuration, pressure fluctuations of the measurement-object gas introduced into the first internal cavity 20 are almost ignorable. The first internal cavity 20 is provided as a space used to adjust an oxygen partial pressure in the measurement-object gas introduced through the second diffusion controlled portion 13. The oxygen partial pressure is adjusted by the operation of a main pump cell 21.

The main pump cell 21 is an electrochemical pump cell made up of an inner pump electrode 22 having a ceiling electrode portion 22a provided almost all over the under surface of the second solid electrolyte layer 6, facing the first internal cavity 20, the outer pump electrode 23 provided so as to be exposed to the external space in a region of the top surface of the second solid electrolyte layer 6, corresponding to the ceiling electrode portion 22a, and the second solid electrolyte layer 6 sandwiched by these electrodes.

The inner pump electrode 22 is formed over the upper and lower solid electrolyte layers (the second solid electrolyte layer 6 and the first solid electrolyte layer 4) defining the first internal cavity 20, and the spacer layer 5 providing a side wall. Specifically, the ceiling electrode portion 22a is formed on the under surface of the second solid electrolyte layer 6, providing a ceiling surface of the first internal cavity 20, a bottom electrode portion 22b is formed on the top surface of the first solid electrolyte layer 4, providing a bottom surface, a side electrode portion (not shown) is formed on the side wall surface (inner surface) of the spacer layer 5, making both side wall portions of the first internal cavity 20, so as to connect those ceiling electrode portion 22a and the bottom electrode portion 22b, and the inner pump electrode 22 is disposed with a structure in a tunnel form at a portion where the side electrode portion is disposed.

The inner pump electrode 22 and the outer pump electrode 23 each are formed as a porous cermet electrode (for example, a cermet electrode of Pt and $ZrO_2$, having an Au content of 1 percent). The inner pump electrode 22 that contacts with a measurement-object gas is formed by using a material of which the reduction ability for NOx components in the measurement-object gas is lowered.

By passing a pump current Ip0 in a positive direction or a negative direction between the inner pump electrode 22 and the outer pump electrode 23 by applying a desired pump voltage Vp0 between the inner pump electrode 22 and the outer pump electrode 23, the main pump cell 21 is capable of pumping out oxygen in the first internal cavity 20 to the external space or pumping oxygen in the external space into the first internal cavity 20.

In order to detect an oxygen concentration (oxygen partial pressure) in an atmosphere in the first internal cavity 20, an electrochemical sensor cell, that is, a main pump control oxygen partial pressure detection sensor cell 80, is made up of the inner pump electrode 22, the second solid electrolyte layer 6, the spacer layer 5, the first solid electrolyte layer 4, the third substrate layer 3, and the reference electrode 42.

An oxygen concentration (oxygen partial pressure) in the first internal cavity 20 is found by measuring an electromotive force (voltage V0) in the main pump control oxygen partial pressure detection sensor cell 80. In addition, the pump current Ip0 is controlled by executing feedback control over the pump voltage Vp0 of a variable power supply 24 such that the voltage V0 becomes a target value. With this configuration, it is possible to maintain the oxygen concentration in the first internal cavity 20 at a predetermined constant value.

The third diffusion controlled portion 30 is a portion that applies predetermined diffusion resistance to a measurement-object gas of which the oxygen concentration (oxygen partial pressure) is controlled by operation of the main pump cell 21 in the first internal cavity 20 to guide the measurement-object gas to the second internal cavity 40.

The second internal cavity 40 is provided as a space used to further adjust the oxygen partial pressure by using an auxiliary pump cell 50 for the measurement-object gas adjusted in the oxygen concentration (oxygen partial pressure) in the first internal cavity 20 in advance and then introduced through the third diffusion controlled portion 30. With this configuration, it is possible to highly accurately maintain the oxygen concentration in the second internal cavity 40 at a constant value, so it is possible to measure a highly accurate NOx concentration with the gas sensor 100.

The auxiliary pump cell 50 is an auxiliary electrochemical pump cell made up of an auxiliary pump electrode 51 having a ceiling electrode portion 51a provided substantially all over the under surface of the second solid electrolyte layer 6, facing the second internal cavity 40, the outer pump electrode 23 (not limited to the outer pump electrode 23, and an adequate electrode outside the sensor element 101 may be used), and the second solid electrolyte layer 6.

The auxiliary pump electrode 51 is disposed in the second internal cavity 40 with a structure in a similar tunnel form to that of the inner pump electrode 22 provided in the above-described first internal cavity 20. In other words, the auxiliary pump electrode 51 has such a structure in a tunnel form that a ceiling electrode portion 51a is formed on the second solid electrolyte layer 6 providing the ceiling surface of the second internal cavity 40, a bottom electrode portion 51b is formed on the first solid electrolyte layer 4 providing the bottom surface of the second internal cavity 40, a side electrode portion (not shown) that couples those ceiling electrode portion 51a and bottom electrode portion 51b is formed on each of both wall surfaces of the spacer layer 5, providing a side wall of the second internal cavity 40. The auxiliary pump electrode 51, as well as the inner pump electrode 22, is formed by using a material of which the reduction ability for NOx components in the measurement-object gas is lowered.

By applying a desired voltage Vp1 between the auxiliary pump electrode 51 and the outer pump electrode 23, the auxiliary pump cell 50 is capable of pumping out oxygen in an atmosphere in the second internal cavity 40 to the external space or pumping oxygen from the external space into the second internal cavity 40.

In order to control an oxygen partial pressure in an atmosphere in the second internal cavity 40, an electrochemical sensor cell, that is, an auxiliary pump control oxygen partial pressure detection sensor cell 81, is made up of the auxiliary pump electrode 51, the reference electrode 42, the second solid electrolyte layer 6, the spacer layer 5, the first solid electrolyte layer 4, and the third substrate layer 3.

The auxiliary pump cell 50 performs pumping with a variable power supply 52 of which the voltage is controlled in accordance with an electromotive force (voltage V1) detected by the auxiliary pump control oxygen partial pressure detection sensor cell 81. With this configuration, the oxygen partial pressure in an atmosphere in the second internal cavity 40 is controlled to a low partial pressure that substantially does not influence measurement of NOx.

Together with this, its pump current Ip1 is used to control the electromotive force of the main pump control oxygen partial pressure detection sensor cell 80. Specifically, the pump current Ip1 is input to the main pump control oxygen partial pressure detection sensor cell 80 as a control signal, and the gradient of the oxygen partial pressure in the measurement-object gas to be introduced from the third diffusion controlled portion 30 into the second internal cavity 40 is controlled to be constantly unchanged by controlling the above-described target value of the voltage V0. When used as a NOx sensor, the oxygen concentration in the second internal cavity 40 is maintained at a constant value of about 0.001 ppm by the functions of the main pump cell 21 and auxiliary pump cell 50.

The fourth diffusion controlled portion 60 is a portion that applies predetermined diffusion resistance to measurement-object gas of which the oxygen concentration (oxygen partial pressure) is controlled by operation of the auxiliary pump cell 50 in the second internal cavity 40 to guide the measurement-object gas to the third internal cavity 61. The fourth diffusion controlled portion 60 plays a role in limiting the amount of NOx flowing into the third internal cavity 61.

The third internal cavity 61 is provided as a space used to perform a process related to measurement of a nitrogen oxide (NOx) concentration in a measurement-object gas on the measurement-object gas adjusted in oxygen concentration (oxygen partial pressure) in the second internal cavity 40 in advance and then introduced through the fourth diffusion controlled portion 60. Measurement of a NOx concentration is mainly performed by operation of a measurement pump cell 41 in the third internal cavity 61.

The measurement pump cell 41 measures a NOx concentration in the measurement-object gas in the third internal cavity 61. The measurement pump cell 41 is an electrochemical pump cell made up of a measurement electrode 44 provided on the top surface of the first solid electrolyte layer 4, facing the third internal cavity 61, the outer pump electrode 23, the second solid electrolyte layer 6, the spacer layer 5, and the first solid electrolyte layer 4. The measurement electrode 44 is a porous cermet electrode made of a material of which the reduction ability for NOx components in the measurement-object gas is raised as compared to the inner pump electrode 22. The measurement electrode 44 also functions as a NOx reduction catalyst that reduces NOx present in an atmosphere in the third internal cavity 61.

Specifically, the measurement electrode 44 is an electrode containing at least one of Pt or Rh that is a catalytically active noble metal. The measurement electrode 44 is preferably an electrode formed of a cermet containing at least one of Pt or Rh and an oxygen-ion-conductive oxide (here, $ZrO_2$). Furthermore, the measurement electrode 44 is preferably porous body. In this embodiment, the measurement electrode 44 is a porous cermet electrode composed of Pt, Rh, and $ZrO_2$.

The measurement pump cell 41 is capable of pumping out oxygen produced as a result of decomposition of nitrogen oxides in an atmosphere around the measurement electrode 44 and detecting the amount of oxygen produced as a pump current Ip2.

In order to detect an oxygen partial pressure around the measurement electrode 44, an electrochemical sensor cell, that is, a measurement pump control oxygen partial pressure detection sensor cell 82, is made up of the first solid electrolyte layer 4, the third substrate layer 3, the measurement electrode 44, and the reference electrode 42. A variable power supply 46 is controlled in accordance with an electromotive force (voltage V2) detected by the measurement pump control oxygen partial pressure detection sensor cell 82.

A measurement-object gas guided into the second internal cavity 40 reaches the measurement electrode 44 in the third internal cavity 61 through the fourth diffusion controlled portion 60 in a situation in which the oxygen partial pressure is controlled. Nitrogen oxides in the measurement-object gas around the measurement electrode 44 are reduced ($2NO \rightarrow N_2+O_2$) to produce oxygen. The produced oxygen is to be pumped by the measurement pump cell 41. At this time, the voltage Vp2 of the variable power supply 46 is controlled such that the voltage V2 detected by the measurement pump control oxygen partial pressure detection sensor cell 82 is constant (target value). The amount of oxygen produced around the measurement electrode 44 is proportional to the concentration of nitrogen oxides in the measurement-object gas, so a nitrogen oxide concentration in the measurement-object gas is calculated by using the pump current Ip2 in the measurement pump cell 41.

An electrochemical sensor cell 83 is made up of the second solid electrolyte layer 6, the spacer layer 5, the first solid electrolyte layer 4, the third substrate layer 3, the outer pump electrode 23, and the reference electrode 42, and it is possible to detect an oxygen partial pressure in a measurement-object gas outside the sensor by using an electromotive force (voltage Vref) obtained by the sensor cell 83.

In the gas sensor 100 having such a configuration, a measurement-object gas of which the oxygen partial pressure is maintained at a constantly unchanged low value (a value that substantially does not influence measurement of NOx) is supplied to the measurement pump cell 41 by operating the main pump cell 21 and the auxiliary pump cell 50. Therefore, it is possible to find a NOx concentration in the measurement-object gas in accordance with a pump current Ip2 that flows as a result of pumping out oxygen, produced by reduction of NOx, by the measurement pump cell 41 substantially in proportion to a NOx concentration in the measurement-object gas.

In addition, the sensor element 101 includes the heater portion 70 that plays a role in temperature adjustment for maintaining the temperature of the sensor element 101 by heating in order to increase the oxygen ion conductivity of the solid electrolyte. The heater portion 70 includes a heater connector electrode 71, a heater 72, a through-hole 73, a heater insulating layer 74, and a pressure release hole 75.

The heater connector electrode 71 is an electrode formed in such a manner as to come into contact with the under surface of the first substrate layer 1. Connection of the heater connector electrode 71 to an external power supply allows electric power to be supplied from the outside to the heater portion 70.

The heater 72 is an electric resistor formed in such a manner as to be sandwiched by the second substrate layer 2 and the third substrate layer 3 from upper and lower sides. The heater 72 is connected to the heater connector electrode 71 via the through-hole 73, and is supplied with electric power from a heater power supply 76 (see FIG. 2) to generate heat to increase and retain the temperature of the solid electrolyte forming the sensor element 101.

The heater 72 is embedded all over the region from the first internal cavity 20 to the third internal cavity 61, and is capable of adjusting the overall sensor element 101 to a temperature at which the solid electrolyte is activated.

The heater insulating layer 74 is an electrically insulating layer formed of an insulating material, such as alumina, on the top and under surfaces of the heater 72. The heater insulating layer 74 is formed for the purpose of obtaining an electrical insulation property between the second substrate layer 2 and the heater 72 and an electrical insulation property between the third substrate layer 3 and the heater 72.

The pressure release hole 75 is a portion provided so as to extend through the third substrate layer 3 and the atmosphere inlet layer 48 and communicate with the reference gas inlet space 43. The pressure release hole 75 is formed for the purpose of easing an increase in internal pressure resulting from an increase in temperature in the heater insulating layer 74.

As shown in FIG. 2, the control apparatus 90 includes the above-described variable power supplies 24, 46, 52, the heater power supply 76, and a controller 91. The controller 91 is a microprocessor including a CPU 92, a storage section 94, and the like. The storage section 94 is, for example, a device that stores various programs and various data. The controller 91 receives input of voltage V0 detected by the main pump control oxygen partial pressure detection sensor cell 80, voltage V1 detected by the auxiliary pump control oxygen partial pressure detection sensor cell 81, voltage V2 detected by the measurement pump control oxygen partial pressure detection sensor cell 82, voltage Vref detected by the sensor cell 83, pump current Ip0 detected by the main pump cell 21, pump current Ip1 detected by the auxiliary pump cell 50 and pump current Ip2 detected by the measurement pump cell 41. The controller 91 controls the pump voltages Vp0, Vp1, Vp2 output by the variable power supplies 24, 46, 52 by outputting a control signal to the variable power supplies 24, 46, 52, thereby controlling the main pump cell 21, the measurement pump cell 41 and the auxiliary pump cell 50. The controller 91 controls the electric power supplied to the heater 72 from the heater power supply 76 by outputting a control signal to the heater power supply 76. The storage section 94 also stores the later-described target values V0*, V0r*, V1*, V1r*, V2*, V2r* and the like. The CPU 92 of the controller 91 controls the cells 21, 41, 50 by referring to these target values V0*, V0r*, V1*, V1r*, V2*, V2r*.

The controller 91 executes a normal time auxiliary pump control process of controlling the auxiliary pump cell 50 so that the oxygen concentration in the second internal cavity 40 reaches a target concentration. Specifically, the controller 91 controls the auxiliary pump cell 50 by executing feedback control on the voltage Vp1 of the variable power supply 52 so that the voltage V1 reaches a constant value (referred to as target value V1*). The target value V1* is defined as the value that causes the oxygen concentration in the second internal cavity 40 to reach a predetermined low oxygen concentration that does not substantially affect measurement of NOx.

The controller 91 performs a normal time main pump control process of controlling the main pump cell 21 by the normal time auxiliary pump control process so that pump current Ip1 which flows when the oxygen concentration in the second internal cavity 40 is adjusted by the auxiliary pump cell 50 reaches a target current (referred to as target current Ip1*). Specifically, the controller 91 sets (feedback-controls) a target value of voltage V0 (referred to as a target value V0*) based on the pump current Ip1 so that the pump current Ip1 caused to flow by the voltage Vp1 reaches a constant target current Ip1*. The controller 91 feedback-controls the pump voltage Vp0 of the variable power supply 24 so that the voltage V0 reaches the target value V0* (in other words, so that the oxygen concentration in the first internal cavity 20 reaches the target concentration). The gradient of the oxygen partial pressure in the measurement-object gas to be introduced from the third diffusion control portion 30 into the second internal cavity 40 is made always constant by the normal time main pump control process. The target value V0* is set to a value such that the oxygen concentration in the first internal cavity 20 is higher than 0% and reaches a low oxygen concentration. The pump current Ip0 which flows during the normal time main pump control process varies according to the oxygen concentration in the measurement-object gas (specifically, the measurement-object gas around the sensor element 101) which flows into the measurement-object gas flow portion through the gas inlet port 10. Thus, the controller 91 can also detect the oxygen concentration in the measurement-object gas based on the pump current Ip0.

The normal time main pump control process and the normal time auxiliary pump control process described above are also collectively referred as a normal time adjustment pump control process. The first internal cavity 20 and the second internal cavity 40 are also collectively referred as an oxygen concentration adjustment chamber. The main pump cell 21 and the auxiliary pump cell 50 are also collectively referred as an adjustment pump cell. The controller 91 performs the normal time adjustment pump control process, thus the adjustment pump cell adjusts the oxygen concentration in the oxygen concentration adjustment chamber.

Furthermore, the controller 91 performs the normal time measurement pump control process of controlling the measurement pump cell 41 so that the voltage V2 reaches a constant value (referred to as a target value V2*) (in other words, so that the oxygen concentration in the third internal cavity 61 reaches a predetermined low concentration). Specifically, the controller 91 controls the measurement pump cell 41 by feedback-controlling the voltage Vp2 of the variable power supply 46 so that the voltage V2 reaches the target value V2*. The normal time measurement pump control process causes oxygen to be pumped out from the third internal cavity 61.

Execution of the normal time measurement pump control process causes oxygen to be pumped out from the third internal cavity 61 so that the oxygen produced due to reduction of NOx in a measurement-object gas in the third internal cavity 61 become substantially zero. The controller 91 obtains a pump current Ip2 as a detected value according to the oxygen produced in the third internal cavity 61 from a specific gas (here, NOx), and calculates the NOx concentration in a measurement-object gas based on the pump current Ip2.

The storage section 94 stores a relational expression (for example, an expression of a linear function) and a map as a correspondence relation between the pump current Ip2 and the NOx concentration. Such relational expression and map can be determined in advance by an experiment.

Figure 3:
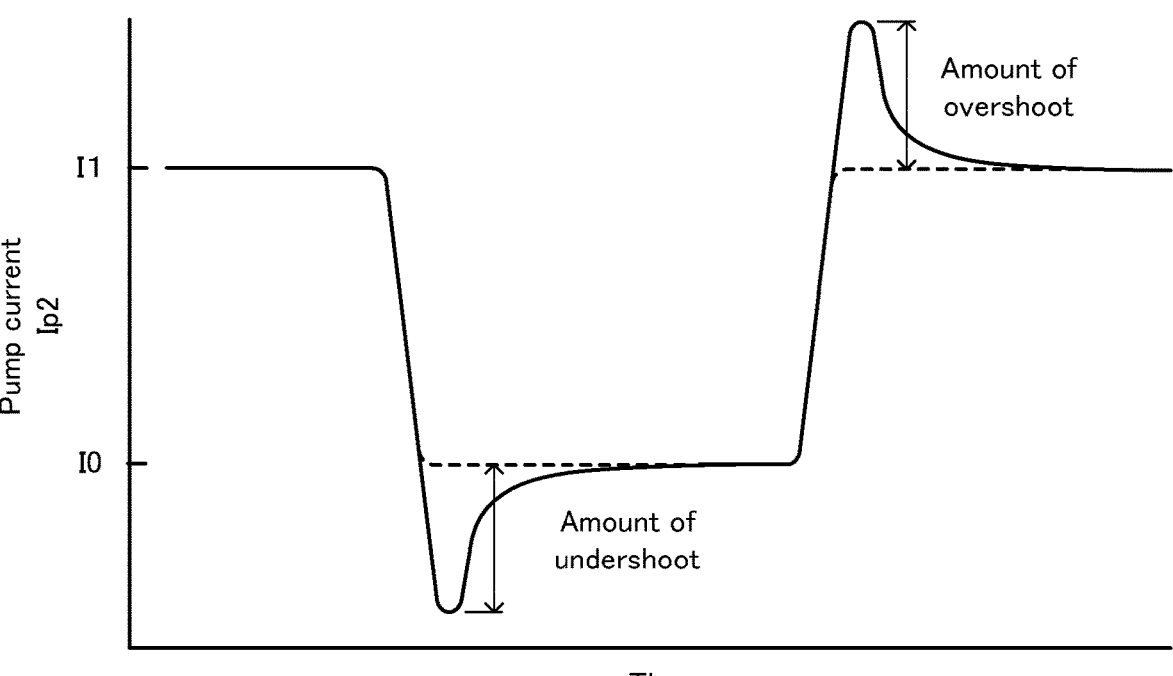
FIG. 3 is a graph showing the pattern of undershoot and overshoot of a pump current Ip2.

Next, the undershoot and overshoot which occur in the pump current Ip2 of the sensor element 101 will be described. FIG. 3 is a graph showing the pattern of undershoot and overshoot of the pump current Ip2. FIG. 3 shows, by a solid line, an example of behavior of the pump current Ip2 when fuel cut of an internal combustion engine is performed in the middle of measuring the NOx concentration in the measurement-object gas by the gas sensor 100. An ideal behavior of the pump current Ip2 is shown by a dashed line.

When fuel cut is started, the NOx concentration in the measurement-object gas rapidly decreases and becomes substantially zero, and when fuel cut is completed, the NOx concentration in the measurement-object gas rapidly increases again. Thus, in principle, as shown by a dashed line in FIG. 3, when fuel cut is started, in quick response to this, the pump current Ip2 having a value corresponding to the NOx concentration should change (change I1→I0 in FIG. 3) to a corresponding value. When fuel cut is completed, in quick response to this, the pump current Ip2 should change (change I0→I1 in FIG. 3) to a corresponding value. However, practically, as shown by a solid line in FIG. 3, in the pump current Ip2, an excessive output variation different from the actual change in the NOx concentration occurs. Specifically, at the start of fuel cut, the pump current Ip2 undergoes an undershoot, in which the value once decreases excessively, then increases up to a value corresponding to the actual NOx concentration. When fuel cut is completed, the pump current Ip2 undergoes an overshoot, in which the value once increases excessively, then decreases down to a value corresponding to the actual NOx concentration. For example, in the gas sensor 100 immediately after being manufactured, such overshoot and undershoot of the pump current Ip2 may not occur, but the overshoot and undershoot tend to increase with use of the gas sensor 100. For example, the amount of undershoot and the amount of overshoot shown in FIG. 3 tend to increase with use of the gas sensor 100. Particularly, when the sensor element 101 is in a high temperature due to the heater 72 and exposed to a high temperature and atmospheric atmosphere at the time of vehicle stop, such overshoot and undershoot are likely to increase. Note that the amount of undershoot can be calculated, for example, as the difference between the minimum value when the pump current Ip2 excessively decreases, and the value when the pump current Ip2 is subsequently stabilized. The amount of overshoot can be calculated, for example, as the difference value between the maximum value when the pump current Ip2 excessively increases, and the value when the pump current Ip2 is subsequently stabilized. Alternatively, the amount of undershoot and the amount of overshoot can also be calculated as a maximum value of the difference value between the value when an excessive output variation occurs in the pump current Ip2, and the value of an ideal pump current Ip2.

The inventors have found out that the overshoot and undershoot, which have increased with use of the gas sensor 100 can be reduced by performing a process of controlling the sensor element 101 so that oxygen in the measurement-object gas flow portion is pumped out in greater volume than when the specific gas concentration is measured (normal time). This process is referred to as the refresh process. Specifically, the refresh process includes at least one of an adjustment pump control process during refresh or a measurement pump control process during refresh, the adjustment pump control process during refresh for controlling the adjustment pump cell so that oxygen in the oxygen concentration adjustment chamber is pumped out in greater volume than in the normal time adjustment pump control process, the measurement pump control process during refresh for controlling the measurement pump cell 41 so that oxygen in the third internal cavity 61 is pumped out in greater volume than in the normal time measurement pump control process.

In the present embodiment, the measurement pump control process during refresh is the same as the normal time measurement pump control process except that the voltage Vp2 of the variable power supply 46 is feedback-controlled so that the voltage V2 reaches a target value V2r* higher than the aforementioned target value V2*. The voltage V2 has a value related to the oxygen concentration difference between the periphery of the reference electrode 42 and the third internal cavity 61, and the lower the oxygen concentration in the third internal cavity 61, the greater the oxygen concentration difference, thus, the voltage V2 also has a high value. Thus, the target value V2r* being higher than the target value V2* indicates that when the measurement pump control process during refresh is performed, the target value of the oxygen concentration in the third internal cavity 61 is set to a lower value than when the normal time measurement pump control process is performed. Therefore, in the measurement pump control process during refresh, the measurement pump cell 41 is controlled so that oxygen in the third internal cavity 61 is pumped out in greater volume than in the normal time measurement pump control process.

The adjustment pump control process during refresh includes at least one of a refresh time main pump control process or a refresh time auxiliary pump control process, the refresh time main pump control process for controlling the main pump cell 21 so that oxygen in the first internal cavity 20 is pumped out in greater volume than in the normal time main pump control process, the refresh time auxiliary pump control process for controlling the auxiliary pump cell 50 so that oxygen in the second internal cavity 40 is pumped out in greater volume than in the normal time auxiliary pump control process. In the present embodiment, the refresh time main pump control process and the refresh time auxiliary pump control process are such processes that as in the measurement pump control process during refresh, the target value of the feedback control is set to a value higher than in the normal time. Specifically, the refresh time main pump control process is such a process that feedback-controls the pump voltage Vp0 of the variable power supply 24 so that the voltage V0 reaches a predetermined target value V0r* higher than the aforementioned target value V0*. In the normal time main pump control process, the target value V0* is set (changed) based on the pump current Ip1; however, in the refresh time main pump control process, the target value V0r* is not changed based on the pump current Ip1, but a predetermined value is used as the target value V0r*. The refresh time auxiliary pump control process is the same as the normal time auxiliary pump control process except that the voltage Vp1 of the variable power supply 52 is feedback-controlled so that the voltage V1 reaches a predetermined target value V1r* higher than the target value V1*.

During the refresh process, preferably, the normal time measurement pump control process is not performed, and furthermore, more preferably, the normal time adjustment pump control process is not performed either. During the refresh process, preferably, the measurement pump cell 41 does not perform control such as pumping oxygen into the third internal cavity 61, and furthermore, more preferably, the main pump cell 21 does not perform control such as pumping oxygen into the first internal cavity 20, and the auxiliary pump cell 50 does not perform control such as pumping oxygen into the second internal cavity 40. For example, when the measurement pump control process during refresh is performed, the normal time measurement pump control process cannot be performed naturally, and preferably, the normal time adjustment pump control process is not performed either. For example, when the measurement pump control process during refresh is performed, it is preferable that a voltage be not applied to the variable power supply 24 and the variable power supply 52, and the main pump cell 21 and the auxiliary pump cell 50 be in a non-operating state. Similarly, when the refresh time main pump control process is performed, it is preferable that a voltage be not applied to the variable power supply 52 and the variable power supply 46, and the auxiliary pump cell 50 and the measurement pump cell 41 be in a non-operating state. When the refresh time auxiliary pump control process is performed, it is preferable that a voltage be not applied to the variable power supply 24 and the variable power supply 46, and the main pump cell 21 and the measurement pump cell 41 be in a non-operating state. In this manner, in the pump cells which are not used for the refresh process among the main pump cell 21, the auxiliary pump cell 50 and the measurement pump cell 41, the normal time pump control process and control to pump in oxygen are preferably not performed, and the pump cells are preferably in a non-operating state.

Figure 4:
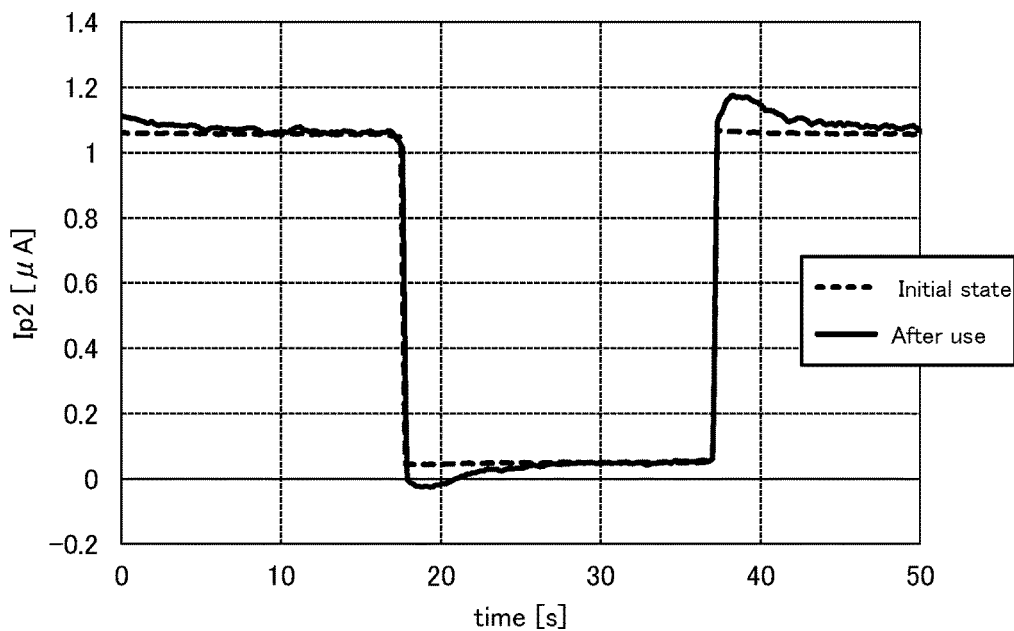
FIG. 4 is a graph showing the manner in which the undershoot and overshoot of the pump current Ip2 in sensor element 101 increase.

FIG. 4 is a graph showing the manner in which the undershoot and overshoot of the pump current Ip2 in the actual sensor element 101 increase. This graph is obtained in the following manner. The sensor element 101 was attached to a pipe, and the control apparatus 90 measured the NOx concentration by controlling the sensor element 101 with a model gas as the measurement-object gas caused to flow through the pipe using a model gas device. Initially, as a model gas, a first model gas (with NO concentration of 500 ppm, $H_2O$ concentration of 12%, oxygen concentration of 0%, and a nitrogen base gas) was caused to flow, then a second model gas (with NO concentration of 0 ppm, $H_2O$ concentration of 0%, oxygen concentration of 21%, and a nitrogen base gas) was caused to flow, and subsequently, the first model gas was caused to flow again to rapidly change the NO concentration, $H_2O$ concentration, and oxygen concentration of the measurement-object gas, thus a state of fuel cut operation was simulated. The flow rate of the model gas was set to 100 L/min, and the temperature thereof was set to 120° C. The temporal change in the pump current Ip2 then was measured. The dashed line in FIG. 4 indicates the temporal change in the pump current IP2 in the sensor element 101 in an initial state (immediately after manufacture). The solid line in FIG. 4 indicates the temporal change in the pump current IP2 in the sensor element 101 in a simulated state after use of the sensor element 101 since the initial state. The sensor element 101 in the initial state was heated by energizing the heater 72, then maintained at about 700° C. to 800° ° C., and in this state, left in the atmosphere for five minutes, thus the sensor element 101 in a simulated state after use was prepared. As shown in FIG. 4, almost no overshoot and undershoot has occurred in the sensor element 101 in the initial state, whereas in the sensor element 101 in a simulated state after use, the overshoot and undershoot have increased.

Figure 5:
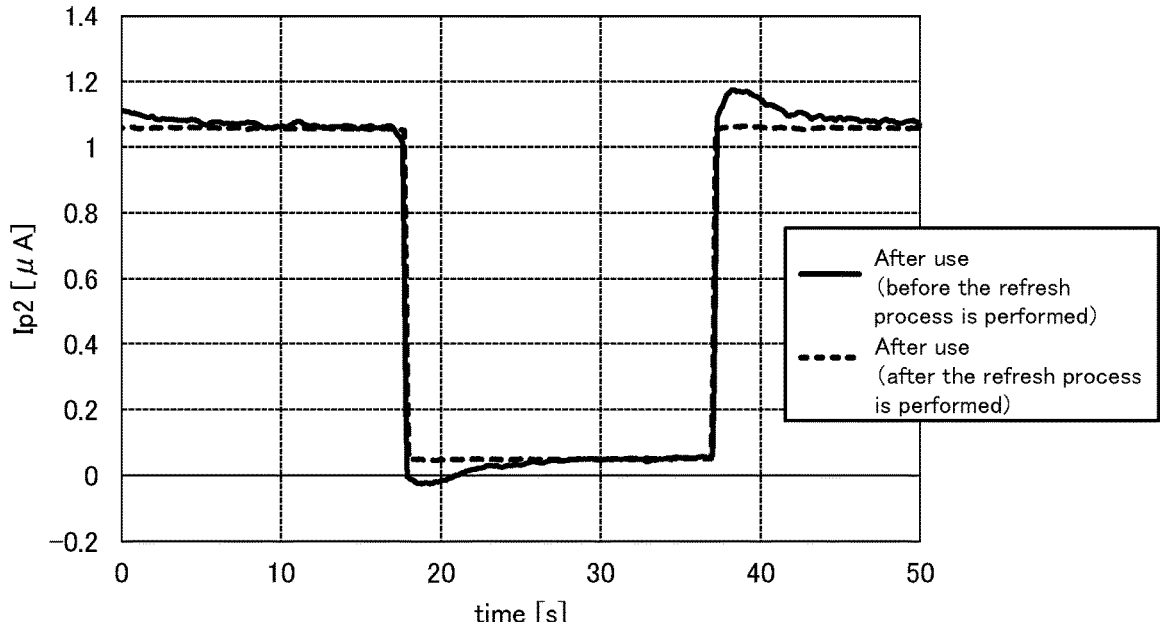
FIG. 5 is a graph showing the pattern of undershoot and overshoot before and after a refresh process.

Next, the refresh process was performed on the sensor element 101 in a simulated state after use as follows. A model gas with $CO_2$ concentration of 15%, $H_2O$ concentration of 15%, and a nitrogen base gas was caused to flow as the measurement-object gas through the pipe with the sensor element 101 attached thereto. In this state, the above-described refresh time main pump control process was performed as the refresh process. The target value V0r* for the refresh time main pump control process was set to 1000 mV, and the processing time thereof was set to 300 seconds. During the refresh process, a voltage was not applied to the variable power supply 46 and the variable power supply 52, and the measurement pump cell 41 and the auxiliary pump cell 50 were in a non-operating state. For the sensor element 101 after the refresh process, the temporal change in the pump current Ip2 when the state of fuel cut operation was simulated was measured in the same manner as in FIG. 4. The results are shown in FIG. 5. The solid line in FIG. 5 indicates the temporal change in the pump current Ip2 in the sensor element 101 before the refresh process is performed. The dashed line in FIG. 5 indicates the temporal change in the pump current Ip2 in the sensor element 101 after the refresh process is performed. As shown in FIG. 5, the undershoot and the overshoot were reduced by performing the refresh process, and the sensor element 101 was recovered to substantially the same state as the state of the sensor element 101 in the initial state shown in FIG. 4. Since undershoot and overshoot occur in the waveform of the pump current Ip2, particularly, the measurement electrode 44 of the sensor element 101 is probably refreshed by the refresh process.

Figure 6:
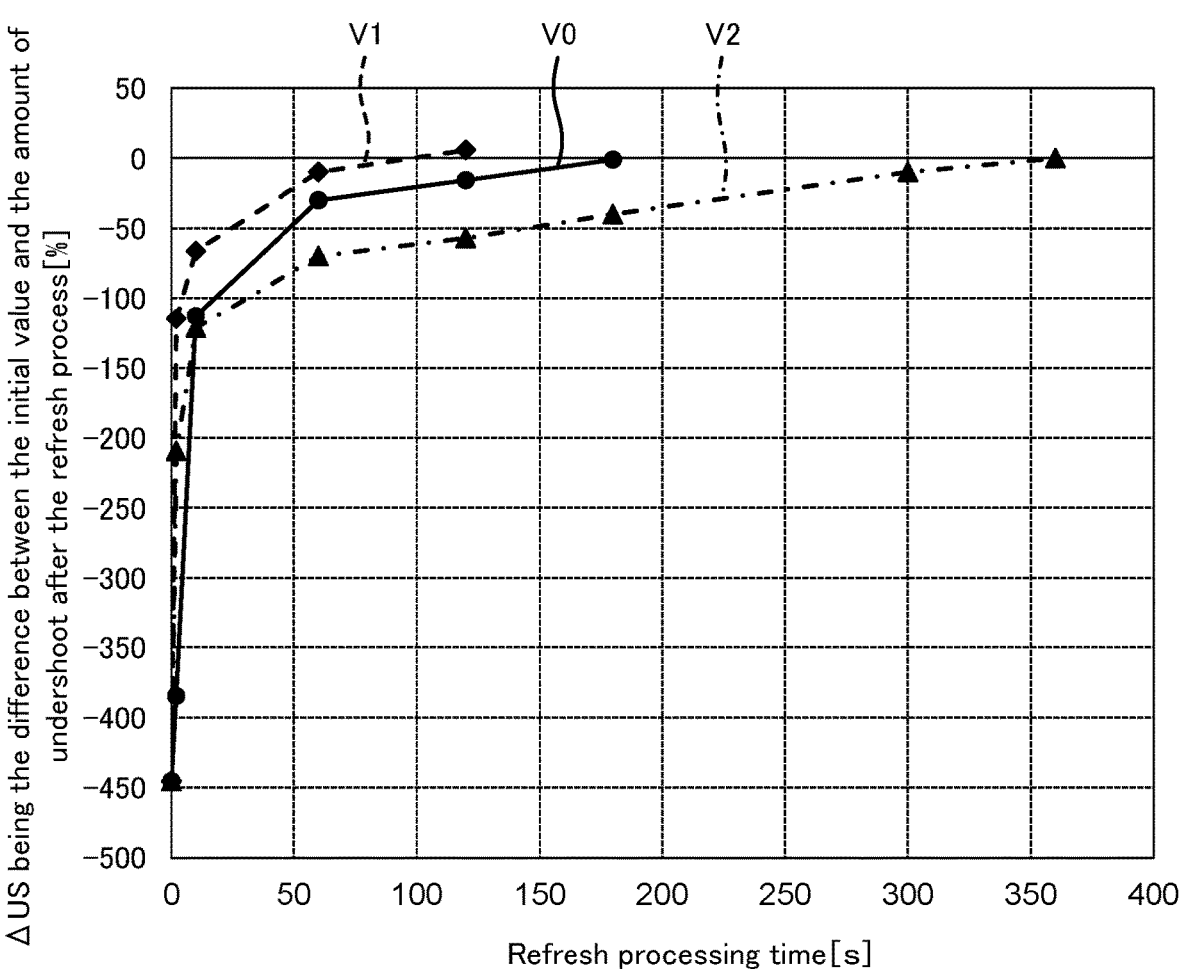
FIG. 6 is a graph showing a relationship between the processing time of refresh process and the effect of reducing the amount of undershoot.

Next, when the refresh time main pump control process was performed as the refresh process in the same manner as in FIG. 5, the temporal change in the pump current Ip2 was measured in the same manner as in FIG. 5 with different processing times, and a relationship between the processing time and the effect of reducing the amount of undershoot was studied. When the refresh time auxiliary pump control process was performed as the refresh process as well as when the measurement pump control process during refresh was performed as the refresh process, a relationship between the processing time and the effect of reducing the amount of undershoot was studied similarly. The results are shown in FIG. 6 and Table 1. The target value V1r* when the refresh time auxiliary pump control process was performed was set to 1000 mV, and during the process, the main pump cell 21 and the measurement pump cell 41 were in a non-operating state. The target value V2r* when the measurement pump control process during refresh was set to 1000 mV, and during the process, the main pump cell 21 and the auxiliary pump cell 50 were in a non-operating state. The vertical axis in FIG. 6 indicates a percentage of ΔUS with respect to an initial value that is the amount (small value close to zero) of undershoot of the sensor element 101 in the initial state, the ΔUS being the difference between the initial value and the amount of undershoot after the refresh process. The difference ΔUS being closer to 0% indicates that the amount of undershoot is reduced, and the sensor element 101 has recovered (been refreshed) to the same state as the initial state. In FIG. 6, the data when the refresh time main pump control process was performed is indicated by a solid line (denoted by "V0" as a legend), the data when the refresh time auxiliary pump control process was performed is indicated by a dashed line (denoted by "V1" as a legend), and the data when the measurement pump control process during refresh was performed is indicated by a dash-dotted line (denoted by "V2" as a legend).

[Table 1]

TABLE 1

| Refresh processing | Difference Δ US [%] | | |
|---|---|---|---|
| time [s] | V0 | V1 | V2 |
| 0 | −445.7 | −445.7 | −445.7 |
| 2 | −384.6 | −114.9 | −209.4 |

TABLE 1-continued

| Refresh processing | Difference Δ US [%] | | |
|---|---|---|---|
| time [s] | V0 | V1 | V2 |
| 10 | −112.9 | −66.2 | −121.4 |
| 60 | −30.0 | −10.0 | −70.0 |
| 120 | −15.8 | 5.9 | −56.9 |
| 180 | −1.0 | — | −40.0 |
| 300 | — | — | −10.0 |
| 360 | — | — | 0.0 |

As seen from FIG. 6 and Table 1, in the sensor element 101 with 0 second processing time of the refresh process, that is, in the aforementioned sensor element 101 in a simulated state after use, the difference ΔUS is approximately −450% (the amount of undershoot is approximately 5.5 times the initial value), however, a tendency has been identified that the difference ΔUS is closer to 0% for a longer processing time. It has been identified that as compared to when the measurement pump control process during refresh was performed (the data denoted by legend "V2" in FIG. 6 and Table 1), the difference ΔUS approaches 0% in a shorter time when the refresh time main pump control process was performed as well as when the refresh time auxiliary pump control process was performed (the data denoted by legends "V0" and "V1" in FIG. 6 and Table 1). In other words, it has been identified that the adjustment pump control process during refresh (in this case, the refresh time main pump control process and the refresh time auxiliary pump control process) has a higher effect of refreshing the sensor element 101 than the measurement pump control process during refresh. Therefore, the refresh process preferably includes the adjustment pump control process during refresh. In addition, as seen from FIG. 6 and Table 1, a tendency has been identified that when the processing time is 10 seconds or less, the difference ΔUS rapidly approaches 0%, and later, relatively slowly approaches 0%. Therefore, even if the refresh process is performed for a long time, probably the refreshing effect is not increased so much, and the refreshing effect is relatively high during the first 10 seconds from the start. Therefore, it is probable that the sensor element 101 can be refreshed more efficiently by performing a short time refresh process multiple times rather than performing one refresh process for a long time. The processing time of the refresh process is preferably one second or more.

The refresh process needs to performed in a state where the measurement-object gas in the measurement-object gas flow portion contains carbon. The "measurement-object contains carbon" includes a case where the measurement-object contains molecules having carbon. For example, when the measurement-object gas contains one or more of carbon (C), carbon monoxide (CO), carbon dioxide ($CO_2$), hydrocarbon (HC), it may be said that the measurement-object gas contains carbon. For example, the refresh process in the above-described example was performed using a model gas with $CO_2$ concentration of 15%, $H_2O$ concentration of 15%, and a nitrogen base gas, however, when the refresh process was performed using a model gas containing no $CO_2$, an effect of reducing undershoot and overshoot was not observed. When the refresh process was performed using a model gas containing ethylene ($C_2H_4$) instead of a model gas containing no $CO_2$, an effect of reducing undershoot and overshoot was observed.

The reason why the effect of the refresh process is obtained like this when the measurement-object gas contains carbon can be inferred as follows. First, in the sensor element 101 in the initial state (immediately after manufacture), at least one of carbon (C), carbon monoxide (CO) or hydrocarbon (HC) adheres to the measurement electrode 44, thus undershoot and overshoot probably have not occurred or are less. When the above-mentioned substances adhering to the measurement electrode 44 reduce in volume with use of the sensor element 101, the undershoot and overshoot probably increase. When the refresh process is performed, oxygen in the measurement-object gas in the measurement-object gas flow portion is pumped out in greater volume than in the normal time, forming a more reducing atmosphere than in the normal time. Thus, production of carbon (C) and carbon monoxide (CO) due to reduction of carbon dioxide ($CO_2$) in the measurement-object gas and production of carbon dioxide ($CO_2$) due to oxidation of carbon (C) and carbon monoxide (CO) in the measurement-object gas are suppressed. Thus, at least one of carbon (C) or carbon monoxide (CO) is probably likely to adhere to the measurement electrode 44 by performing the refresh process. As a result, the measurement electrode 44 can be recovered (refreshed) to the same state as the initial state, thus the undershoot and overshoot are probably reduced. When hydrocarbon (HC) is present in the measurement-object gas, the measurement-object gas forms a reducing atmosphere as described above by performing the refresh process, thus production of water ($H_2O$) and carbon dioxide ($CO_2$) due to oxidation of hydrocarbon (HC) is suppressed. Thus, hydrocarbon (HC) is probably likely to adhere to the measurement electrode 44 by performing the refresh process. Therefore, also in this case, the measurement electrode 44 can be recovered (refreshed) to the same state as the initial state, thus the undershoot and overshoot are probably reduced.

When the measurement pump control process during refresh is performed, oxygen is pumped out from the periphery of the measurement electrode 44 in greater volume than in the normal time, thus for example, carbon (C) and carbon monoxide (CO) in the periphery of the measurement electrode 44 are oxidized by part of the oxygen taken and produced from the water ($H_2O$) in the measurement-object gas, and carbon dioxide ($CO_2$) is probably produced. In contrast, when the adjustment pump control process during refresh is performed, the measurement-object gas with oxygen already pumped out reaches the measurement electrode 44, thus probably, almost no carbon dioxide ($CO_2$) is produced around the measurement electrode 44. Due to this difference, when the measurement pump control process during refresh is performed, the amount of carbon (C) and carbon monoxide (CO) adhering to the measurement electrode 44 is probably reduced, as compared to when the adjustment pump control process during refresh is performed. Because of this reason, as shown in FIG. 6, the adjustment pump control process during refresh probably has a higher effect of refreshing the sensor element 101 than the measurement pump control process during refresh.

Figure 7:
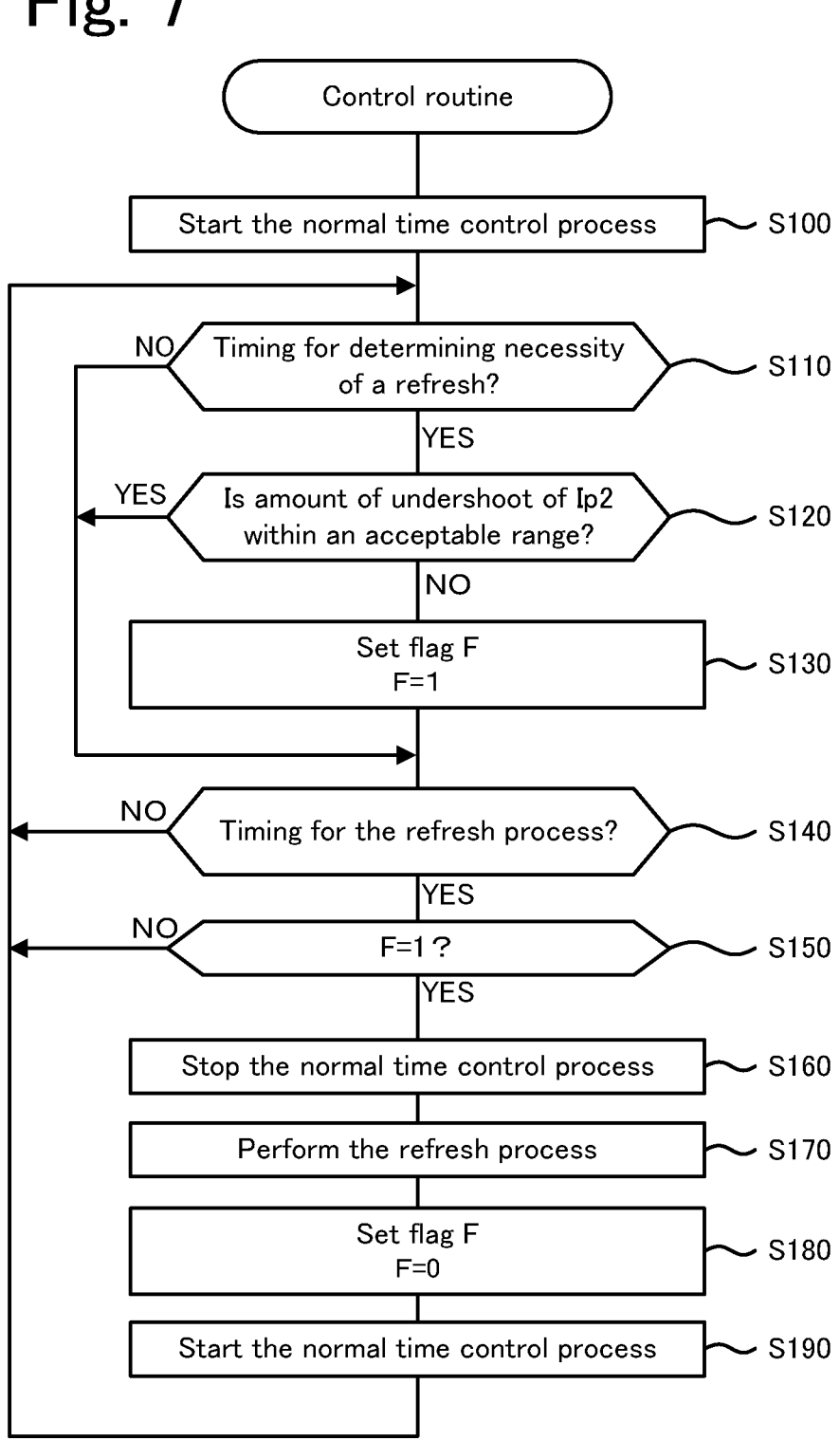
FIG. 7 is a flowchart showing an example of a control routine.

Next, an example of measurement of the NOx concentration and the refresh process performed by the controller 91 of the gas sensor 100 will be described. FIG. 7 is a flowchart showing an example of a control routine performed by the controller 91. The controller 91 stores the routine, for example, in the storage section 94. The controller 91 controls, for example, the electric power to be supplied to the heater 72 by the heater power supply 76, and when the temperature of the heater 72 reaches a target temperature (e.g., 800° C.), starts the control routine.

When the control routine is started, the CPU 92 of the controller 91 first starts the normal time control process for measuring the NOx concentration (step S100). In the normal time control process, the CPU 92 performs the aforementioned normal time adjustment pump control process (the normal time main pump control process and the normal time auxiliary pump control process) as well as the aforementioned normal time measurement pump control process. The CPU 92 calculates the NOx concentration in the measurement-object gas based on the pump current Ip2 which is caused to flow by the normal time measurement pump control process.

Next, the CPU 92 determines whether a necessity determination timing for determining necessity of a refresh of the sensor element 101 is reached (step S110). The necessity determination timing is a timing at which undershoot or overshoot may occur in the pump current Ip2. As described in PTL 2, when the $H_2O$ concentration in the measurement-object gas varies, undershoot and overshoot are likely to occur. Thus, the necessity determination timing is preferably set to a timing at which rapid change occurs in the $H_2O$ concentration in the measurement-object gas in the measurement-object gas flow portion. In the present embodiment, the necessity determination timing is set to the start time of fuel cut of an internal combustion engine. When fuel cut is started, the measurement-object gas assumes the same state as the state of the atmospheric atmosphere, and the $H_2O$ concentration is highly likely to change rapidly, thus the change timing is suitable for the necessity determination timing. When fuel cut is started, the NOx concentration in the measurement-object gas also changes rapidly. For example, the controller 91 detects the start of fuel cut based on fuel cut execution information obtained from an engine ECU (not illustrated) of the internal combustion engine. For example, the CPU 92 determines every predetermined time whether fuel cut execution information has been obtained from the engine ECU, the fuel cut execution information indicating that fuel cut has been performed, and when the fuel cut execution information is obtained, determines that a necessity determination timing is reached because fuel cut has been performed.

In step S110, when a necessity determination timing is determined to be reached, the CPU 92 calculates the amount of undershoot of the pump current Ip2, and performs a refresh necessity determination process of determining whether the calculated value is within an acceptable range (step S120). In the present embodiment, a necessity determination timing is determined to be reached at the start of fuel cut, thus immediately after that, the pump current Ip2 rapidly decreases with fuel cut as shown in FIGS. 3 to 5. The CPU 92 calculates the amount of undershoot from the behavior (waveform) of the pump current Ip2 then. The determination in step S120 may be performed by comparing the acceptable range with the amount of undershoot itself calculated this time, or by comparing the acceptable range with the difference between the amount of undershoot (the initial value) in the initial state of the sensor element 101, and the amount of undershoot calculated this time. For example, the upper limit value of the acceptable range is set as the value of pump current Ip2 corresponding to NOx concentration of 5 ppm, and when the amount of undershoot itself exceeds the upper limit value, the amount of undershoot may be determined to be out of the acceptable range. Alternatively, when the difference between the initial value and the amount of undershoot this time exceeds the upper limit value, the amount of undershoot may be determined to be out of the acceptable range. Information on acceptable range and initial value may be stored in the storage section 94 in advance. In step S120, when the amount of undershoot is out of the acceptable range, the CPU 92 determines that the refresh process is necessary, and sets flag F to value 1 (step S130). When the refresh process is necessary, the flag F is set to value 1, and when the refresh process is unnecessary and at the start of the control routine, the flag F is set to value 0.

After step S130, when it is determined in step S110 that a necessity determination timing is not reached, or when the amount of undershoot is within the acceptable range in step S120, the CPU 92 determines whether an execution timing for the refresh process is reached (step S140). The execution timing for the refresh process is a timing at which the measurement-object gas in the measurement-object gas flow portion is considered to contain carbon. In the present embodiment, the execution timing is during operation (other than fuel cut) of the internal combustion engine. When an operation other than fuel cut is being performed, the measurement-object gas basically contains carbon (particularly, $CO_2$), thus the timing is suitable for the refresh process. For example, the CPU 92 determines whether an execution timing for the refresh process is reached based on the fuel cut execution information obtained from the engine ECU (not illustrated) of the internal combustion engine. For example, the CPU 92 determines every predetermined time whether fuel cut execution information has been obtained from the engine ECU, the fuel cut execution information indicating that fuel cut has been performed, and when the fuel cut execution information is not obtained, determines that an operation other than fuel cut is being performed currently, and an execution timing for the refresh process is reached.

In step S140, when an execution timing for the refresh process is determined to be reached, the CPU 92 determines whether the flag F has value 1 (step S150), and when the flag F has value 1, stops the normal time control process (step S160) started in step S100, and performs the refresh process (step S170). In short, when it is determined that an execution timing for the refresh process is reached and a refresh is necessary (the flag F has value 1), the CPU 92 performs the refresh process. The CPU 92 performs, for example, the refresh time main pump control process for 10 seconds as the refresh process. In this case, since the normal time control process was stopped in step S160, the normal time auxiliary pump control process and the normal time measurement pump control process are not performed during the refresh process. When the refresh process is completed, the CPU 92 sets the flag F to value 0 (step S180), and starts the normal time control process again (step S190) to start detection of the NOx concentration.

In step S190, after starting the normal time control process, when it is determined in step S140 that an execution timing for the refresh process is not reached, or when the flag F does not have value 1 in step S150, the CPU 92 performs the processes in and after step S110. The CPU 92 performs the control routine in FIG. 7 as described above, thereby making it possible to perform the refresh process as necessary while measuring the NOx concentration. In this manner, the refresh process of the present invention can be performed not only at the time of manufacture or at the time of maintenance of the gas sensor 100, but also at the time of use of the gas sensor 100 (for example, during operation of the internal combustion engine).

Here, the correspondence relation between the components of the present embodiment and the components of the present invention will be clarified. The layered body obtained by laminating six layers: the first substrate layer 1, the second substrate layer 2, the third substrate layer 3, the first solid electrolyte layer 4, the spacer layer 5, and the second solid electrolyte layer 6 of the present embodiment in this order corresponds to an element body of the present invention, the outer pump electrode 23 corresponds to an outer measurement electrode, the third internal cavity 61 corresponds to a measurement chamber, the measurement electrode 44 corresponds to an inner measurement electrode, the measurement pump cell 41 corresponds to a measurement pump cell, the first internal cavity 20 and the second internal cavity 40 correspond to an oxygen concentration adjustment chamber, the main pump cell 21 and the auxiliary pump cell 50 correspond to an adjustment pump cell, the reference electrode 42 corresponds to a reference electrode, the measurement pump control oxygen partial pressure detection sensor cell 82 corresponds to a measurement voltage detection sensor cell, the sensor element 101 corresponds to a sensor element, the pump current Ip2 corresponds to a measurement pump current, and the control apparatus 90 corresponds to a specific gas concentration detection section, a necessity determiner, and a refresh controller.

With the gas sensor 100 of the present embodiment described in detail above, the control apparatus 90 performs the refresh necessity determination process of determining necessity of a refresh of the sensor element 101 based on the undershoot of the pump current Ip2 at a time of rapid change, and when a refresh is determined to be necessary, performs the refresh process. The refresh process includes at least one of the adjustment pump control process during refresh or the measurement pump control process during refresh, the adjustment pump control process during refresh for controlling the adjustment pump cell (in this case, the main pump cell 21 and the auxiliary pump cell 50) so that oxygen in the oxygen concentration adjustment chamber (in this case, the first internal cavity 20 and the second internal cavity 40) is pumped out in greater volume than in the normal time adjustment pump control process, the measurement pump control process during refresh for controlling the measurement pump cell 41 so that oxygen in the third internal cavity 61 is pumped out in greater volume than in the normal time measurement pump control process. An increase in the undershoot and overshoot of the pump current Ip2 with use of the gas sensor 100 can be suppressed by performing such a refresh process.

The refresh process includes the adjustment pump control process during refresh. The adjustment pump control process during refresh has a higher effect of refreshing the sensor element 101 than the measurement pump control process during refresh. Therefore, the effect of suppressing the undershoot and overshoot of the pump current Ip2 can be increased and the refresh process can be performed in a shorter time by performing at least the adjustment pump control process during refresh in the refresh process.

Furthermore, the oxygen concentration adjustment chamber has the first internal cavity 20, and the second internal cavity 40 provided downstream of the first internal cavity 20 and upstream of the third internal cavity 61. The adjustment pump cell has the main pump cell 21 that adjusts the oxygen concentration in the first internal cavity 20, and the auxiliary pump cell 50 that adjusts the oxygen concentration in the second internal cavity 40. The adjustment pump control process during refresh includes at least one of a process of controlling the main pump cell 21 or a process of controlling the auxiliary pump cell 50, the process of controlling the main pump cell 21 being performed so that oxygen in the first internal cavity 20 is pumped out in greater volume than in the normal time adjustment pump control process, the process of controlling the auxiliary pump cell 50 being performed so that oxygen in the second internal cavity 40 is pumped out in greater volume than in the normal time adjustment pump control process.

The measurement-object gas is exhaust gas of an internal combustion engine, and the controller 91 performs the refresh necessity determination process based on the behavior of the pump current Ip2 at a time of rapid change caused by fuel cut of the internal combustion engine. As described above, undershoot of the pump current Ip2 is likely to occur at a time of rapid change in the $H_2O$ concentration rather than rapid change in the NOx concentration in the measurement-object gas. At the time of fuel cut of the internal combustion engine, the measurement-object gas temporarily assumes a state similar to the state of the atmospheric atmosphere, thus it is highly probable that the $H_2O$ concentration rapidly changes. Thus, necessity of a refresh can be determined more appropriately by performing necessity determination based on the behavior of the pump current Ip2 at a time of rapid change caused by fuel cut of the internal combustion engine. For example, when the NOx concentration rapidly changes, but no rapid change occurs in the $H_2O$ concentration, even in a state where the refresh process is necessary for the sensor element 101, the undershoot and overshoot of the pump current Ip2 actually may not increase so much. In this case, when the refresh necessity determination process is performed, the refresh process may be determined to be unnecessary, thus necessity determination may not be performed appropriately. In contrast, when the refresh necessity determination process is performed at the time of fuel cut in which it is highly probable that the $H_2O$ concentration rapidly changes, necessity determination can be performed more appropriately.

Furthermore, when the amount of undershoot at a time of rapid change in the pump current Ip2 is out of an acceptable range, the control apparatus 90 determines that a refresh of the sensor element 101 is necessary. Thus, necessity of a refresh can be determined appropriately based on the amount of undershoot.

When the measurement-object gas in the measurement-object gas flow portion is considered to contain carbon, the control apparatus 90 performs the refresh process. The refresh process needs to be performed in a state where the measurement-object gas contains carbon, thus refresh can be effectively performed by performing the refresh process when the measurement-object gas in the measurement-object gas flow portion is considered to contain carbon. Thus, for example, the following situation is unlikely occur: even if the refresh process is performed, the undershoot and overshoot are not reduced, and the refresh process is necessary again.

The processing time of the refresh process is 1 second or more and 10 seconds or less. With the processing time of 1 second or more, the sensor element 101 can be refreshed more reliably. Even if the refresh process is performed for a long time, the refreshing effect is not increased so much, and the refreshing effect is relatively high during the first 10 seconds from the start. Because NOx concentration cannot be detected correctly during the refresh process, it is preferable that the processing time of the refresh process be short. With the processing time of 10 seconds or less, the time during which the NOx concentration cannot be detected correctly is reduced, and the sensor element 101 can be efficiently refreshed. Note that with 10 seconds or less processing time of the refresh process, the undershoot and overshoot of the pump current Ip2 may not be sufficiently reduced by one refresh process. However, in this case, in the next refresh necessity determination process (for example, in step S120 after execution of step S170 in FIG. 7), the refresh process is determined to be necessary, and the refresh process is to be performed again. Thus, the refresh process is repeatedly performed until the refresh process is determined to be unnecessary in the refresh necessity determination process, and the undershoot and overshoot are finally reduced to an extent such that the refresh process is determined to be unnecessary.

With 10 seconds or less processing time of the refresh process, light-off time of the sensor element 101 can be reduced. For example, it may take time since the normal time control process is started in step S190 in FIG. 7 until the pump current Ip2 reaches a value corresponding to the NOx concentration. The time is called light-off time, and the NOx concentration cannot be correctly measured until the light-off time elapses. The light-off time tends to be longer for a longer refresh processing time. With 10 seconds or less processing time of the refresh process, the light-off time of the sensor element 101 can be reduced, and measurement of the NOx concentration can be started quickly after the refresh process.

Note that the present invention is not limited to the above-described embodiment at all, and it is needless to say that embodiments can be implemented in various forms within the technical scope of the present invention.

For example, in the above-described embodiment, the CPU 92 performs necessity determination of the refresh process in step S120 in FIG. 7 based on the amount of undershoot of the pump current Ip2; however, without being limited to this, the CPU 92 may perform necessity determination based on the undershoot of the pump current Ip2. For example, the CPU 92 may perform necessity determination of the refresh process based on the minimum value of undershoot of the pump current Ip2. Alternatively, the CPU 92 may perform necessity determination of the refresh process based on the undershoot time, that is the time since the pump current Ip2 takes the minimum value of undershoot until the pump current Ip2 is stabilized later. The CPU 92 may perform necessity determination of the refresh process based on the overshoot of the pump current Ip2. For example, the CPU 92 may perform necessity determination of the refresh process based on the amount of overshoot of the pump current Ip2. The CPU 92 may perform necessity determination of the refresh process based on the maximum value of overshoot of the pump current Ip2. Alternatively, the CPU 92 may perform necessity determination of the refresh process based on the overshoot time, that is the time since the pump current Ip2 takes the maximum value of undershoot until the pump current Ip2 is stabilized later. The CPU 92 may perform necessity determination of the refresh process based on both the undershoot and overshoot of the pump current Ip2.

When the necessity determination of the refresh process is performed based on the amount of overshoot of the pump current Ip2, the necessity determination timing determined in step S110 may be, for example, the completion time of fuel cut as a timing when overshoot may occur. At the completion time of fuel cut, detection can be made as at the start time of fuel cut based on the above-described fuel cut execution information. For example, the CPU 92 determines every predetermined time whether fuel cut execution information has been obtained from the engine ECU, the fuel cut execution information indicating that fuel cut has been performed, and when fuel cut execution information is not obtained for the first time since fuel cut execution information obtained last, may determine that necessity determination timing is reached because the fuel cut is completed.

In the above-described embodiment, necessity of a refresh is determined based on the undershoot of the pump current Ip2; however, necessity of a refresh may be determined not only based on the pump current Ip2 itself, but also based on a value convertible to the pump current Ip2 or a value considered to be equivalent to the pump current Ip2. For example, necessity of a refresh may be determined based on the behavior (at least one of the undershoot or overshoot) of the value of the NOx concentration [ppm] based on the pump current Ip2.

In the above-described embodiment, the refresh process in step S170 is the refresh time main pump control process; however, as described above, the refresh process may include at least one of the adjustment pump control process during refresh or the measurement pump control process during refresh. Therefore, in step S170, one or more of the refresh time main pump control process, the refresh time auxiliary pump control process, and the measurement pump control process during refresh may be performed. However, as described using FIG. 6 and Table 1, the adjustment pump control process during refresh has a higher refreshing effect than the measurement pump control process during refresh, thus the refresh process preferably includes at least one of the refresh time main pump control process or the refresh time auxiliary pump control process In the above-described embodiment, each of the refresh time main pump control process, the refresh time auxiliary pump control process, and the measurement pump control process during refresh is a process of increasing a target value higher than in the normal time, but may be a process of performing control so that oxygen in the measurement-object gas flow portion is pumped out in greater volume than in the normal time. For example, the control process at the time of refresh may be a process of performing constant voltage control of the pump cell, or a process of performing constant current control of the pump cell without performing feedback control using a target value. For example, the refresh time main pump control process may be a process of controlling the variable power supply 24 by the CPU 92 without performing feedback control so that the pump voltage Vp0 reaches a predetermined constant voltage higher than the value during the normal time main pump control process. Alternatively, the refresh time main pump control process may be a process of controlling the variable power supply 24 by the CPU 92 so that the pump current Ip0 reaches a predetermined constant current higher than the value during the normal time main pump control process. The same applies to the refresh time auxiliary pump control process and the measurement pump control process during refresh.

In the above-described embodiment, an execution timing for the refresh process during an operation other than fuel cut of an internal combustion engine has been illustrated, but an execution timing is not limited thereto, and may be a timing at which the measurement-object gas in the measurement-object gas flow portion is considered to contain carbon. For example, when a vehicle with the gas sensor 100 attached is a hybrid vehicle, an execution timing may be during electric driving (engine is stopped) of the hybrid vehicle, and exhaust gas staying time (when exhaust gas remains around the sensor element 101). An execution timing may be a timing at which the measurement-object gas is considered to be non-atmospheric atmosphere. The refresh process may be performed without making determination as to whether an execution timing is reached, specifically, determination as to whether the measurement-object gas in the measurement-object gas flow portion is considered to contain carbon. For example, the sensor element 101 performs the control routine in FIG. 7 basically during operation of an internal combustion engine, and an effect of performing the refresh process is obtained. Therefore, step S140 may be omitted. In this case, for example, the refresh process is performed during fuel cut and not during operation, and the undershoot and overshoot of the pump current Ip2 may not be reduced. However, in this case, the refresh process is determined to be necessary in the next refresh necessity determination process, and the refresh process is to be performed again, and when the internal combustion engine is in operation then, the effect of the refresh process is obtained. Even when it is not determined whether an execution timing for the refresh process is reached, the undershoot and overshoot can be finally reduced by performing the refresh process multiple times. However, as described above, the NOx concentration cannot be measured correctly during the time of refresh process, thus whether an execution timing is reached is preferably determined to reduce such time as much as possible.

In the above-described embodiment, the CPU 92 detects the start time of fuel cut, or an operation other than fuel cut based on the fuel cut execution information, however, may detect these based on the pump current Ip0. As described above, the pump current IP0 flowing during the normal time main pump control process varies with the oxygen concentration in the measurement-object gas (specifically, the measurement-object gas around the sensor element 101) which flows into the measurement-object gas flow portion through the gas inlet port 10. When the measurement-object gas is exhaust gas of an internal combustion engine, the oxygen concentration in the measurement-object gas at the time of fuel cut is approximately the same as the oxygen concentration in the atmosphere. Therefore, the CPU 92 can determine whether fuel cut is in operation according to whether the pump current IP0 flowing during the normal time main pump control process has a value corresponding to a concentration (e.g., 20 to 22%) in a predetermined range, the concentration being regarded as the same as the oxygen concentration in the atmosphere. Thus, for example, the CPU 92 determines whether the start time of fuel cut is reached based on the pump current Ip0 in step S110, and when the start time is reached, may determine that a necessity determination timing is reached. The CPU 92 determines whether fuel cut is in operation based on the pump current Ip0 in step S140, and when fuel cut is not in operation, may determine that an execution timing for the refresh process is reached. When the necessity determination of the refresh process is performed in step S120 based on the amount of overshoot of the pump current Ip2, the CPU 92 determines whether the completion time of fuel cut is reached based on the pump current Ip0 in step S110, and when the completion time is reached, may determine that a necessity determination timing is reached.

Although not explained in the above-described embodiment, fuel cut may be started during the refresh process in step S170. In this case, the refresh process may be terminated without waiting for elapse of the processing time (10 seconds in the above-described embodiment).

In the above-described embodiment, the oxygen concentration adjustment chamber has the first internal cavity 20 and the second internal cavity 40; however, without being limited to this, for example, the oxygen concentration adjustment chamber may further include another internal cavity, or one of the first internal cavity 20 and the second internal cavity 40 may be omitted. Similarly, in the above-described embodiment, the adjustment pump cell has the main pump cell 21 and the auxiliary pump cell 50; however, without being limited to this, for example, the adjustment pump cell may further include another pump cell, or one of the main pump cell 21 and the auxiliary pump cell 50 may be omitted. For example, when the oxygen concentration in the measurement-object gas can be sufficiently reduced only by the main pump cell 21, the auxiliary pump cell 50 may be omitted. In this case, the CPU 92 may perform a process of controlling the main pump cell 21 as the normal time adjustment pump control process so that the oxygen concentration in the oxygen concentration adjustment chamber (the first internal cavity 20) reaches a target concentration, for example. More specifically, a target value V0* is defined in advance, and the CPU 92 may control the main pump cell 21 by feedback-controlling the pump voltage Vp0 of the variable power supply 24 so that the voltage V0 reaches the target value V0* (in other words, the oxygen concentration in the first internal cavity 20 reaches the target concentration).

In the above-described embodiment, the outer pump electrode 23 serves as an outer main pump electrode which is part of the main pump cell 21 and disposed in a portion in contact with the measurement-object gas outside the sensor element 101, as an outer auxiliary pump electrode which is part of the auxiliary pump cell 50 and disposed in a portion in contact with the measurement-object gas outside the sensor element 101, and as an outer measurement electrode which is part of the measurement pump cell 41 and disposed in a portion in contact with the measurement-object gas outside the sensor element 101; however, without being limited to this, one or more of the outer main pump electrode, the outer auxiliary pump electrode, and the outer measurement electrode may be provided outside the sensor element 101 separately from the outer pump electrode 23.

In the above-described embodiment, the outer pump electrode 23 is exposed to the outside of the sensor element 101; however, the configuration is not limited thereto, and the outer pump electrode 23 may be provided outside the element bodies (layers 1 to 6) so as to come into contact with a measurement-object gas. For example, the sensor element 101 may include a porous protective layer that covers the element bodies (layers 1 to 6), and the outer pump electrode 23 may also be covered with the porous protective layer.

Figure 8:
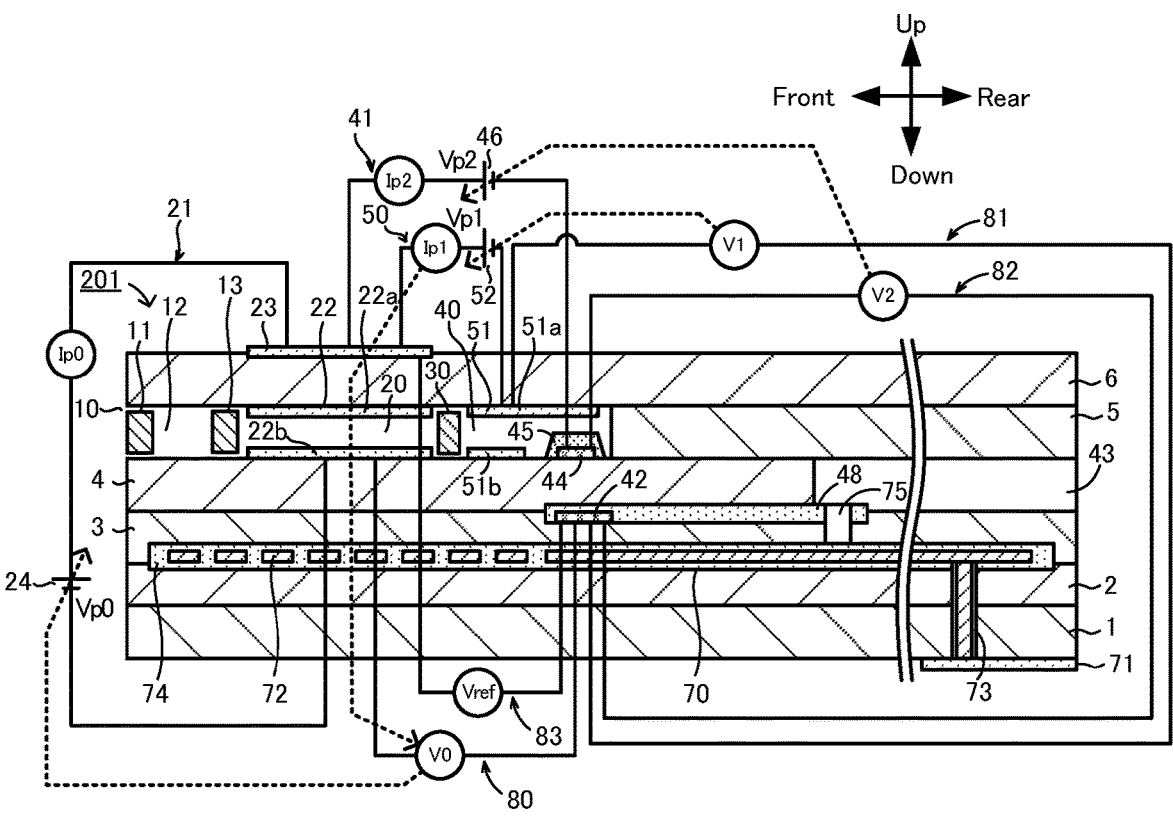
FIG. 8 is a schematic cross-sectional view of a sensor element 201 according to a modification.

In the above-described embodiment, the sensor element 101 of the gas sensor 100 includes the first internal cavity 20, the second internal cavity 40, and the third internal cavity 61; however, the configuration is not limited thereto. For example, as in the case of a sensor element 201 of FIG. 8, the third internal cavity 61 may be omitted. In the sensor element 201 of a modification shown in FIG. 8, the gas inlet port 10, the first diffusion controlled portion 11, the buffer space 12, the second diffusion controlled portion 13, the first internal cavity 20, the third diffusion controlled portion 30, and the second internal cavity 40 are formed adjacent to each other in this order between the under surface of the second solid electrolyte layer 6 and the top surface of the first solid electrolyte layer 4 so as to communicate with each other. The measurement electrode 44 is disposed on the top surface of the first solid electrolyte layer 4 in the second internal cavity 40. The measurement electrode 44 is coated with a fourth diffusion controlled portion 45. The fourth diffusion controlled portion 45 is a film made up of a ceramic porous material, such as alumina ($Al_2O_3$). The fourth diffusion controlled portion 45, as well as the fourth diffusion controlled portion 60 of the above-described embodiment, plays a role in limiting the amount of NOx flowing into the measurement electrode 44. The fourth diffusion controlled portion 45 also functions as a protection film for the measurement electrode 44. The ceiling electrode portion 51*a* of the auxiliary pump electrode 51 is formed up to just above the measurement electrode 44. With the thus configured sensor element 201 as well, it is possible to detect a NOx concentration in accordance with, for example, a pump current Ip2 as in the case of the above-described embodiment. In this case, the surroundings of the measurement electrode 44 function as a measurement chamber.

In the above-described embodiment, the element body of the sensor element 101 is a layered body including a plurality of solid electrolyte layers (layers 1 to 6); however, the configuration is not limited thereto. The element body of the sensor element 101 may include at least one oxygen-ion-conductive solid electrolyte layer and include a measurement-object gas flow portion inside. For example, the layers 1 to 5 other than the second solid electrolyte layer 6 in FIG. 1 may be a structural layer made of a material other than a solid electrolyte (for example, a layer made of alumina). In this case, the electrodes of the sensor element 101 just need to be disposed on the second solid electrolyte layer 6. For example, the measurement electrode 44 of FIG. 1 just needs to be disposed on the under surface of the second solid electrolyte layer 6. The reference gas inlet space 43 may be provided in the spacer layer 5 instead of the first solid electrolyte layer 4, the atmosphere inlet layer 48 may be provided between the second solid electrolyte layer 6 and the spacer layer 5 instead of being provided between the first solid electrolyte layer 4 and the third substrate layer 3, and the reference electrode 42 may be provided on the rear side with respect to the third internal cavity 61 on the under surface of the second solid electrolyte layer 6.

In the above-described embodiment, in the normal time main pump control process, the control apparatus 90 sets (executes feedback control on) the target value V0* of the voltage V0 based on the pump current Ip1 so that the pump current Ip1 reaches a target value Ip1* and executes feedback control on the pump voltage Vp0 so that the voltage V0 reaches a target value V0*; however, another control may be employed. For example, in the normal time main pump control process, the control apparatus 90 may execute feedback control on the pump voltage Vp0 in accordance with the pump current Ip1 so that the pump current Ip1 reaches a target value Ip1*. In other words, the control apparatus 90 may directly control the pump voltage Vp0 (by extension, control the pump current Ip0) in accordance with the pump current Ip1 by omitting acquisition of the voltage V0 from the main pump control oxygen partial pressure detection sensor cell 80 and setting of the target value V0*.

In the above-described embodiment, the gas sensor 100 detects a NOx concentration as a specific gas concentration; however, the configuration is not limited thereto. Another oxide concentration may be used as a specific gas concentration. In the case where the specific gas is an oxide, oxygen is produced when the specific gas itself is reduced in the third internal cavity 61 as in the case of the above-described embodiment, so the CPU 92 is able to detect a specific gas concentration based on a detected value corresponding to the oxygen. Alternatively, the specific gas may be a non-oxide, such as ammonia. When the specific gas is a non-oxide, the specific gas is converted to an oxide, for example, in the first internal cavity 20 (for example, ammonia is oxidized and converted to NO), and oxygen is produced when the oxide after conversion is reduced in the third internal cavity 61, so the CPU 92 is able to detect a specific gas concentration by acquiring a detected value corresponding to the oxygen. In this manner, in whichever case the specific gas is an oxide or a non-oxide, the gas sensor 100 is able to detect a specific gas concentration based on the oxygen produced from a specific gas in the third internal cavity 61.

Figure 9:
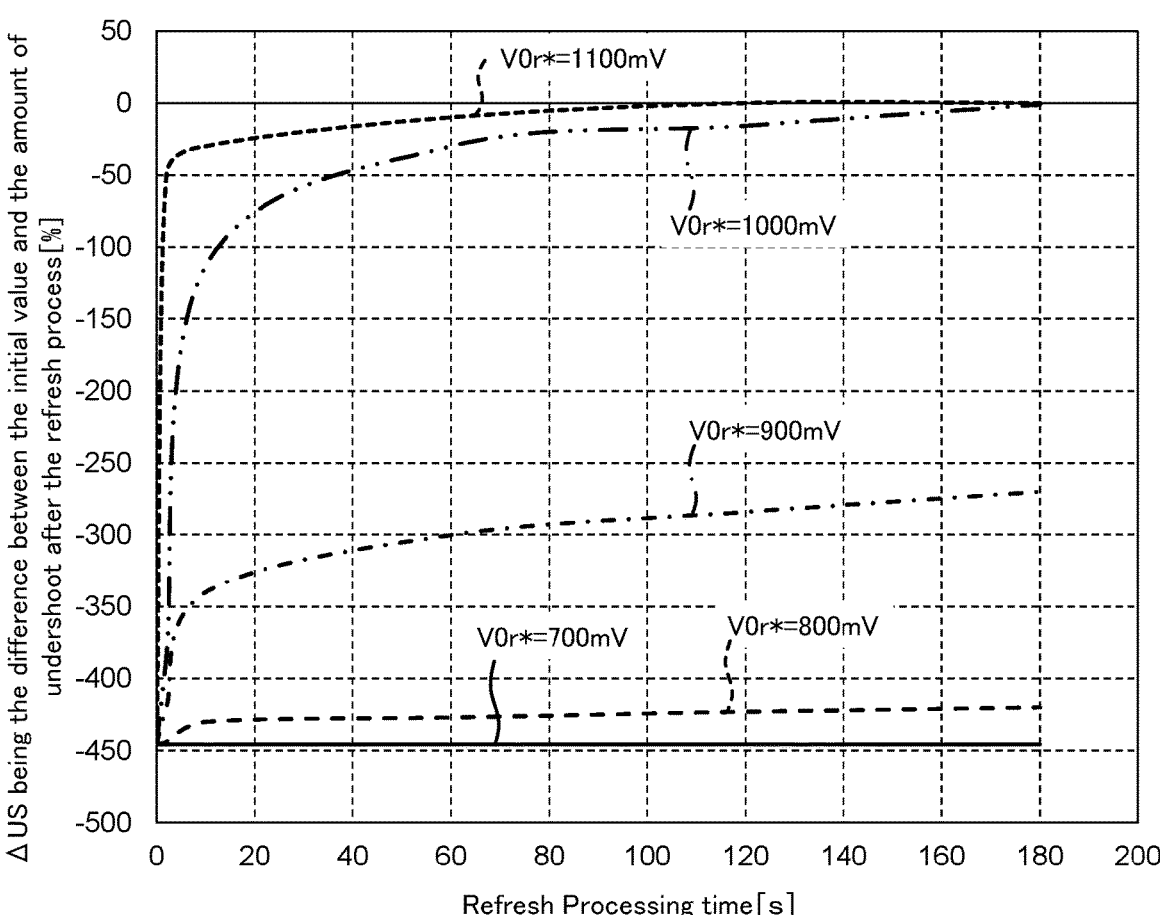
FIG. 9 is a graph showing a relationship between the processing time of refresh process and the effect of reducing the amount of undershoot.

In the above-described embodiment, the target value V0r* in the refresh time main pump control process has a value higher than the target value V0*, and in FIG. 6, the target value V0r* is set 1000 mV. The target value V0r* is preferably higher than 700 mV and lower than or equal to 1100 mV. The inventors studied the relationship between the refresh processing time and the effect of reducing the amount of undershoot with the target value V0r* varied in the range of 700 mV to 1100 mV. The results are shown in FIG. 9. The horizontal axis and the vertical axis in FIG. 9 are the same as the horizontal axis and the vertical axis in FIG. 6, and in the graphs of FIG. 9, measurements were made in the same conditions as in the graph indicated by the solid line (denoted by "V0" as a legend) in FIG. 6 except that the target value V0r* is varied. FIG. 9 shows the results when the target value V0r* is varied in five ways: 700 mV, 800 mV, 900 mV, 1000 mV, and 1100 mV. The result (the graph indicated by a dot-dot-dash line in FIG. 9) with the target value V0r* of 1000 mV in FIG. 9 is approximately the same as that of the solid line graph in FIG. 6 with the same target value V0r* of 1000 mV. As seen from FIG. 9, it has been identified that for a higher target value V0r*, the difference ΔUS tends to approach 0% in a shorter time, providing a higher effect of refreshing the sensor element 101. With the target value V0r* of 700 mV, almost no effect of refreshing the sensor element 101 was obtained, thus the target value V0r* preferably exceeds 700 mV, and it is probably more preferable that the target value V0r* be higher than or equal to 800 mV. The voltage Vp0 at the time of the refresh time main pump control process is higher for a higher target value V0r*. When the voltage Vp0 is too high, reduction may occur in the solid electrolyte (in this case, zirconia) of the sensor element 101. Therefore, the target value V0r* is preferably lower than or equal to 1100 mV. As with the target value V0r*, the target value V1r* for the refresh time auxiliary pump control process, and the target value V2r* for the measurement pump control process during refresh are preferably higher than 700 mV and 1100 mV or lower, and more preferably 800 mV or higher.

What is claimed is:

1. A gas sensor comprising:
   a sensor element including:
      an element body which includes an oxygen-ion-conductive solid electrolyte layer, and is internally provided with a measurement-object gas flow portion that introduces a measurement-object gas and causes the measurement-object gas to flow,
      a measurement pump cell having an outer measurement electrode provided outside the element body to come into contact with the measurement-object gas, and an inner measurement electrode disposed in a measurement chamber of the measurement-object gas flow portion, the measurement pump cell being configured to pump out oxygen from a periphery of the inner measurement electrode to a periphery of the outer measurement electrode,
      an adjustment pump cell that adjusts an oxygen concentration in an oxygen concentration adjustment chamber provided upstream of the measurement chamber of the measurement-object gas flow portion, a reference electrode disposed inside the element body to come into contact with a reference gas which serves as a reference for detection of a specific gas concentration in the measurement-object gas, and a measurement voltage detection sensor cell that detects a voltage for measurement across the reference electrode and the inner measurement electrode; and a control apparatus configured to:

perform a normal time adjustment pump control process of operating the adjustment pump cell, and a normal time measurement pump control process of pumping out oxygen in the measurement chamber by controlling the measurement pump cell so that the measurement voltage of the measurement voltage detection sensor cell reaches a target value, then detectthe specific gas concentration in the measurement-object gas based on a measurement pump current which flows through the measurement pump cell by the normal time measurement pump control process;

perform a refresh necessity determination process of determining necessity of a refresh of the sensor element based on at least one of undershoot or overshoot at a time of a predetermined change in the measurement pump current; and upon a determination that the refresh is necessary in the refresh necessity determination process, perform a refresh process including at least one of an adjustment pump control process during refresh or a measurement pump control process during refresh, the adjustment pump control process during refresh for controlling the adjustment pump cell so that oxygen in the oxygen concentration adjustment chamber is pumped out in greater volume than in the normal time adjustment pump control process, the measurement pump control process during refresh for controlling the measurement pump cell so that oxygen in the measurement chamber is pumped out in greater volume than in the normal time measurement pump control process.

2. The gas sensor according to claim 1, wherein the refresh process includes the adjustment pump control process during refresh.

3. The gas sensor according to claim 2, wherein the oxygen concentration adjustment chamber has a first internal cavity, and a second internal cavity provided downstream of the first internal cavity and upstream of the measurement chamber, the adjustment pump cell has a main pump cell that adjusts an oxygen concentration in the first internal cavity, and an auxiliary pump cell that adjusts an oxygen concentration in the second internal cavity, and the adjustment pump control process during refresh includes at least one of a process of controlling the main pump cell or a process of controlling the auxiliary pump cell, the process of controlling the main pump cell being performed so that oxygen in the first internal cavity is pumped out in greater volume than in the normal time adjustment pump control process, the process of controlling the auxiliary pump cell being performed so that oxygen in the second internal cavity is pumped out in greater volume than in the normal time adjustment pump control process.

4. The gas sensor according to claim 1, wherein the measurement-object gas is exhaust gas of an internal combustion engine, and the refresh necessity determination process is performed based on the at least one of undershoot or overshoot of the measurement pump current at the time of the predetermined change caused by fuel cut of the internal combustion engine.

5. The gas sensor according to claim 1, wherein the control apparatus is configured to determine that the refresh is necessary when at least one of an amount of the undershoot or an amount of the overshoot at the time of the predetermined change in the measurement pump current is out of an acceptable range.

6. The gas sensor according to claim 1, wherein when the measurement-object gas in the measurement-object gas flow portion is considered to contain carbon, the control apparatus performs the refresh process.

7. The gas sensor according to claim 1, wherein a processing time of the refresh process is 1 second or more and 10 seconds or less.

* * * * *